MAGNETIC DRUM MEMORY FOR ELECTRONIC COMPUTERS
Filed Dec. 1, 1953 18 Sheets-Sheet 1
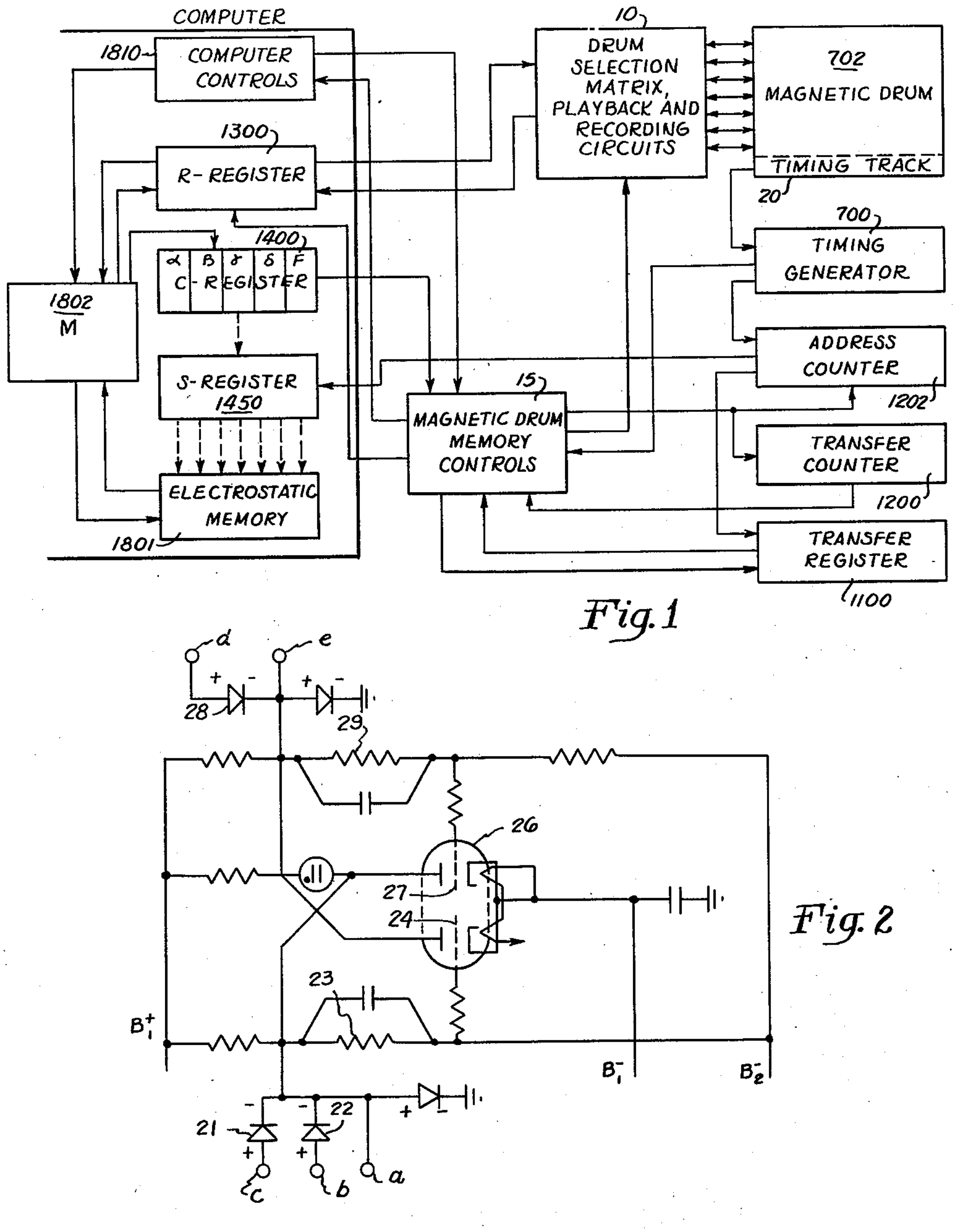
Fig. 1 Fig. 2
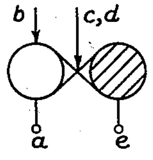
Fig. 2-A
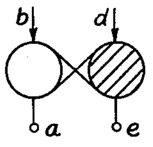
Fig. 2-B
INVENTOR
Ragnar Thorensen
William R. Arsenault
Biagio F. Ambrosio
BY
Howard L. Rose
AGENT MAGNETIC DRUM MEMORY FOR ELECTRONIC COMPUTERS
Filed Dec. 1, 1953 18 Sheets-Sheet 2
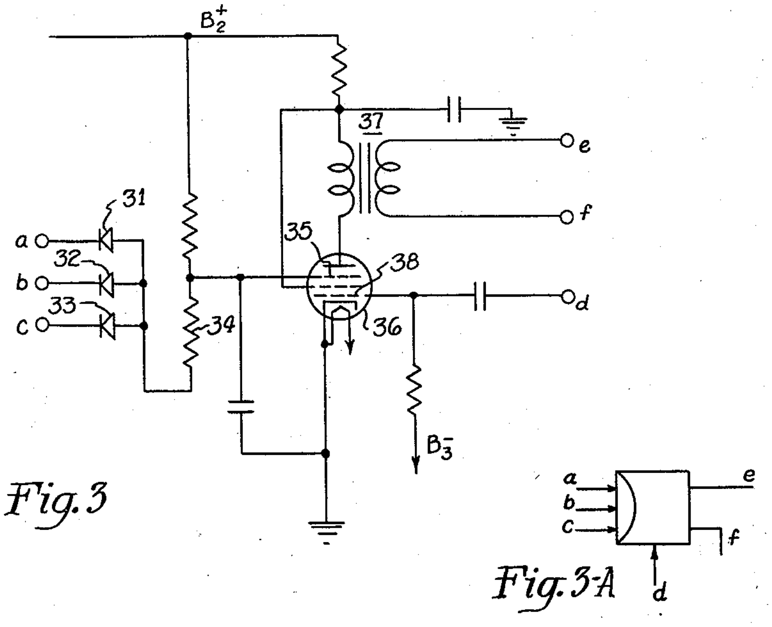
Fig. 3, Fig. 3-A
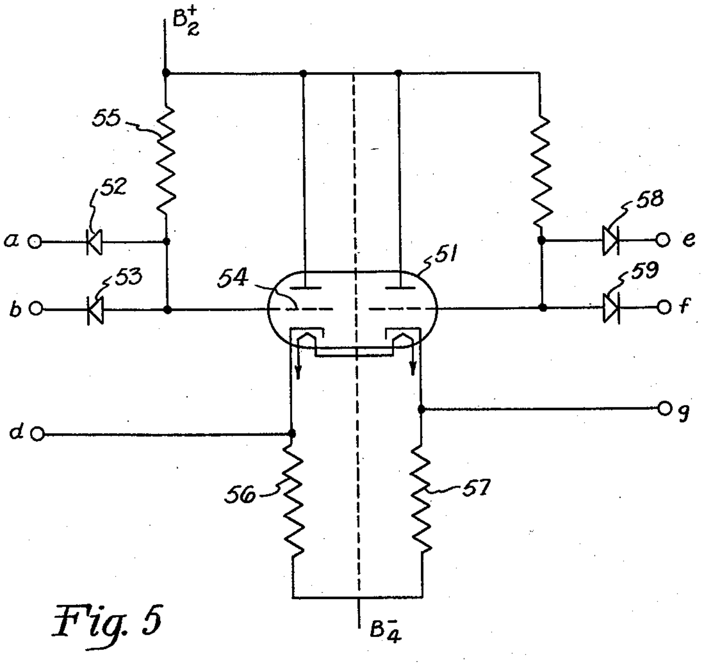
Fig. 5
INVENTOR
Ragnar Thorensen
William R. Arsenault
Biagio F. Ambrosio
BY
Howard L. Rose
AGENT MAGNETIC DRUM MEMORY FOR ELECTRONIC COMPUTERS
Filed Dec. 1, 1953 18 Sheets-Sheet 3
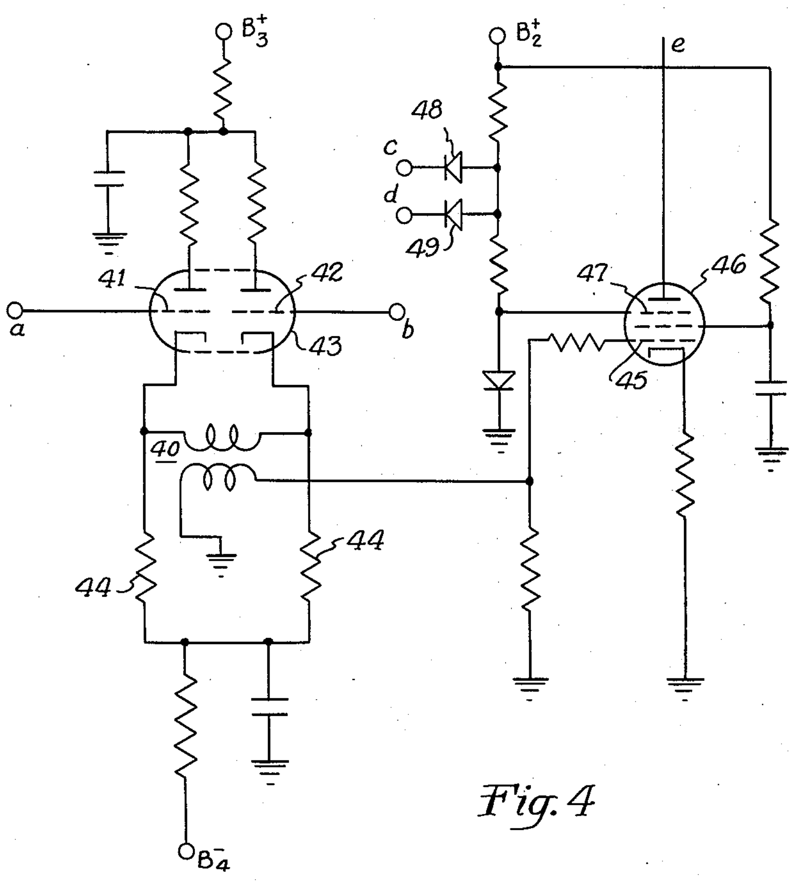
Fig. 4
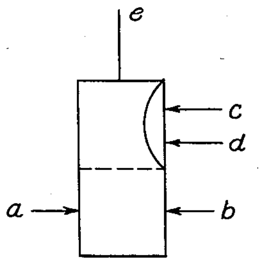
Fig. 4-A
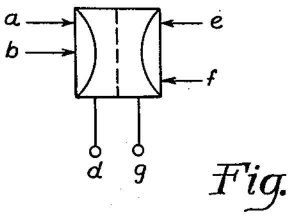
Fig. 5-A
INVENTOR
Ragnar Thorensen
William R. Arsenault
Biagio F. Ambrosio
BY
Howard L. Rose
AGENT INVENTOR
Ragnar Thorensen
William R. Arsenault
Biagio F. Ambrosio
BY
Howard L. Ross
AGENT INVENTOR
Ragnar Thorensen
William R. Arsenault
Biagio F. Ambrosio
BY
Howard L. Rose
AGENT

MAGNETIC DRUM MEMORY FOR ELECTRONIC COMPUTERS

Filed Dec. 1, 1953 18 Sheets-Sheet 6

INVENTOR
Ragnar Thorensen
William R. Arsenault
Biagia F. Ambrosio
BY
Howard L. Rose
AGENT INVENTOR
Ragnar Thorensen
William R. Arsenault
Biagio F. Ambrosio
BY
Howard L. Rose
AGENT INVENTOR
Ragnar Thorensen
William R. Arsenault
Biagio F. Ambrosio
BY
Howard L. Rose
AGENT INVENTOR
Ragnar Thorensen
William R. Arsenault
Biagio F. Ambrosio
BY
Howard L. Rose
AGENT INVENTOR
Ragnar Thorensen
William R. Arsenault
Biagio F. Ambrosio
BY
Howard L. Rose
AGENT INVENTOR
Ragnar Thorensen
William R. Arsenault
Biagio F. Ambrosio
BY
Howard L. Rose
AGENT INVENTOR
Ragnar Thorensen
William R. Arsenault
Biagio F. Ambrosio BY Howard L. Rose
AGENT

TABLE I

| α | β | γ | δ | F |
|---|---|---|---|---|
| SPECIFIES CTR LINE PAIR | SPECIFIES NO. OF WORDS TRANSFERRED (INDENTIFIES PORTION OF DRUM CHANNEL) WHEN β IS<br>0000 32 WORDS<br>0100, 0110 } 16 WORDS<br>1100, 1101, 1110, 1111 } 8 WORDS | SPECIFIES DRUM CHANNEL | FOR DRUM COMMANDS δ IS 0110000 | OPERATION SYMBOL: WRITE=0010 READ=0001 |

INVENTOR
Ragnar Thorensen
William R. Arsenault
Biagio F. Ambrosio
BY Howard L. Rose
AGENT

MAGNETIC DRUM MEMORY FOR ELECTRONIC COMPUTERS

INVENTOR
Ragnar Thorensen
William R. Arsenault
Biagio F. Ambrosio
BY
Howard L. Rose
AGENT Feb. 16, 1960 R. THORENSEN ET AL 2,925,587

MAGNETIC DRUM MEMORY FOR ELECTRONIC COMPUTERS

Filed Dec. 1, 1953 18 Sheets-Sheet 15

INVENTOR
Ragnar Thorensen
William R. Arsenault
Biagio F. Ambrosio
BY Howard L. Rose
AGENT

MAGNETIC DRUM MEMORY FOR ELECTRONIC COMPUTERS

Filed Dec. 1, 1953 18 Sheets-Sheet 16

INVENTOR
Ragnar Thorensen
William R. Arsenault
Biagio F. Ambrosio

BY

Howard L. Rose

AGENT

Feb. 16, 1960 R. THORENSEN ET AL 2,925,587

MAGNETIC DRUM MEMORY FOR ELECTRONIC COMPUTERS

Filed Dec. 1, 1953 18 Sheets-Sheet 17

INVENTOR
Ragnar Thorensen
William R. Arsenault
Biagio F. Ambrosio

BY

Howard L. Rose

AGENT

MAGNETIC DRUM MEMORY FOR ELECTRONIC COMPUTERS

INVENTOR
Ragnar Thorensen
William R. Arsenault
Biagio F. Ambrosio

BY

Howard L. Rose

AGENT

United States Patent Office 2,925,587

Patented Feb. 16, 1960

2,925,587

MAGNETIC DRUM MEMORY FOR ELECTRONIC COMPUTERS

Ragnar Thorensen, Los Angeles, William R. Arsenault, Santa Monica, and Biagio F. Ambrosio, Los Angeles, Calif., assignors to the United States of America as represented by the Secretary of Commerce Application December 1, 1953, Serial No. 395,638

11 Claims. (Cl. 340—174)

The present invention relates to a magnetic drum memory for use with electronic computers and in particular to control circuitry for such a unit that greatly reduces the overall access time to the drum memory.

In the modern electronic computer, an internal memory is utilized for storage of information not being currently used. Memories such as the electrostatic type of storage system are very rapid and their operation can be synchronized with the basic repetition rate of the computer. Ideally all computers would have such a memory large enough to handle all information that might be necessary for obtaining the complete solution to a particular problem. However, the expense involved in providing an electrostatic memory capable of handling the most complex problems would be prohibitive. Therefore it is often necessary to provide an auxiliary memory system for computers which, although slow as compared to the electrostatic memory, is far cheaper to build and maintain.

The magnetic drum memory system can provide a very large quantity of storage for a relatively low cost, since all of the circuitry and machinery involved is easily maintained as compared to the circuitry necessary for an electrostatic memory. As previously pointed out, however, the magnetic drum type of memory is relatively slow and cannot be operated in synchronism with the computer. In particular, if information is required from some small specific location in the drum, the computer may have to wait up to a maximum of one drum revolution before receiving any information. This waiting time, or access time, is measured in milliseconds as compared with only a few microseconds for the internal electrostatic memory. In order to improve such situation means are provided to transfer information in sizeable blocks from the magnetic drum memory to the electrostatic memory, thus minimizing the total number of referrals. The blocks of information are arranged on the drum to cut down any dead waiting time for the drum, that is, the time taken for the drum to come to a specific position before transcribing can occur. The information comprising a block is stored sequentially around the circumference of the drum so that each block completely fills a respective band or channel on the drum. When a transfer to or from the drum memory is made, the entire channel is handled at one time and transfer of information starts immediately after the desired channel has been selected and continues for exactly one revolution of the drum, thus eliminating waiting time.

It is therefore the primary object of the present invention to provide a magnetic drum memory system in which the access time to the drum memory is held to a minimum.

Another object of the present invention is to provide a magnetic drum memory system in which the address of the particular word passing under the reading and writing heads is known at all times and is available to the control circuitry of the computer immediately upon the receipt of the drum operation signal.

Another object of the present invention is to provide a magnetic drum memory system in which the information recorded on the drum is grouped in words, there being a predetermined number of words in a single channel of the drum, and in which a complete drum operation consists of reading or writing a complete channel from or on the drum.

Another object of the present invention is to provide a magnetic drum memory system in which designated half and quarter channels may be read into the computer during a given drum operation.

Another object of the present invention is to provide a magnetic drum storage system in which there is an equality between the number of words in a single channel of the drum and a predetermined number of complete lines of the electrostatic memory.

Another object of the present invention is to provide a magnetic drum memory system in which the coder may choose the particular consecutive lines of the electrostatic memory to be communicated with while the drum system controls the particular location in those lines at which the transfer of information is to start.

Other uses and advantages of the invention will become apparent upon reference to the specification and drawings.

Figure 1 is a simplified block diagram of the magnetic drum memory system of the present invention.

Figure 2 is a circuit diagram of the flip-flop circuit used in the present invention.

Figure 3 is a wiring diagram of the pulse gate used in the present invention.

Figure 4 is a wiring diagram of the read gate used in the present invention.

Figure 5 is a wiring diagram of the direct-current gates used in the present invention.

In Figures 2–6 above, the symbol appearing in juxtaposition to the wiring diagram is the symbol which will be used in Figures 7–14 to designate that particular circuit.

Figures 7–14 are wiring diagrams which constitute a complete circuit diagram of the drum system of the present invention.

Figures 15, 21:
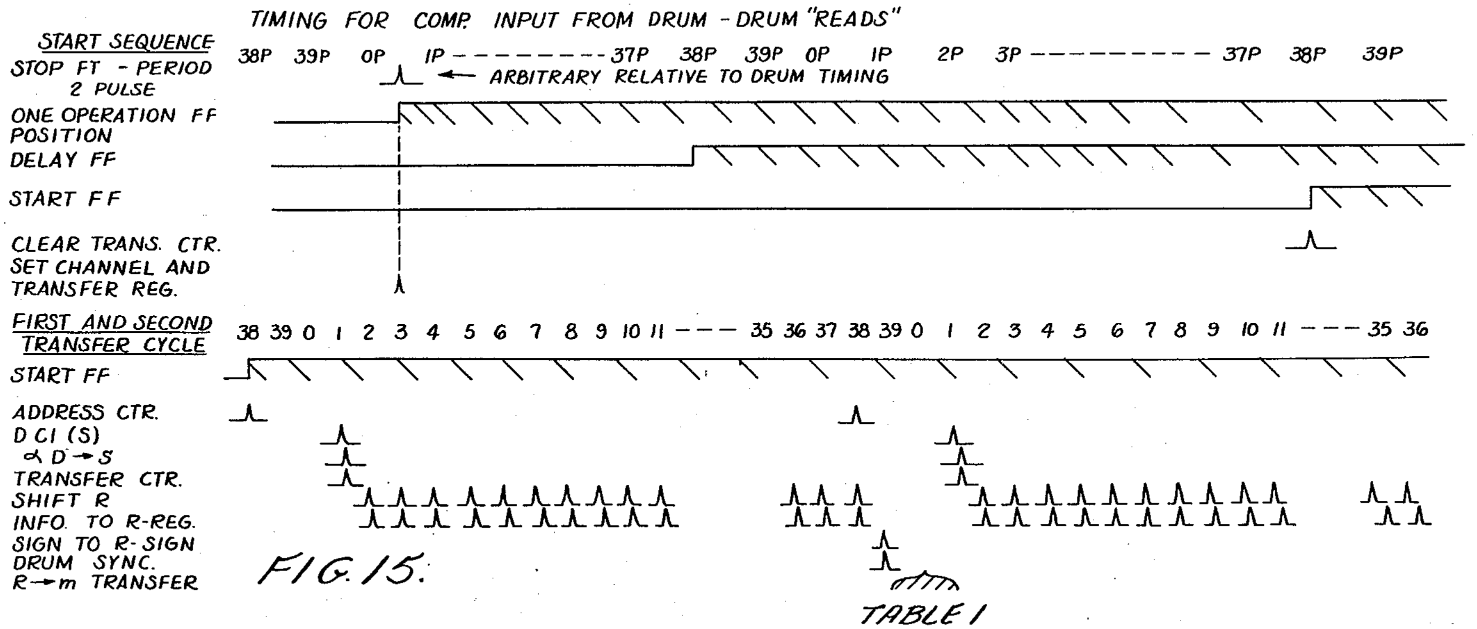
Figure 16:
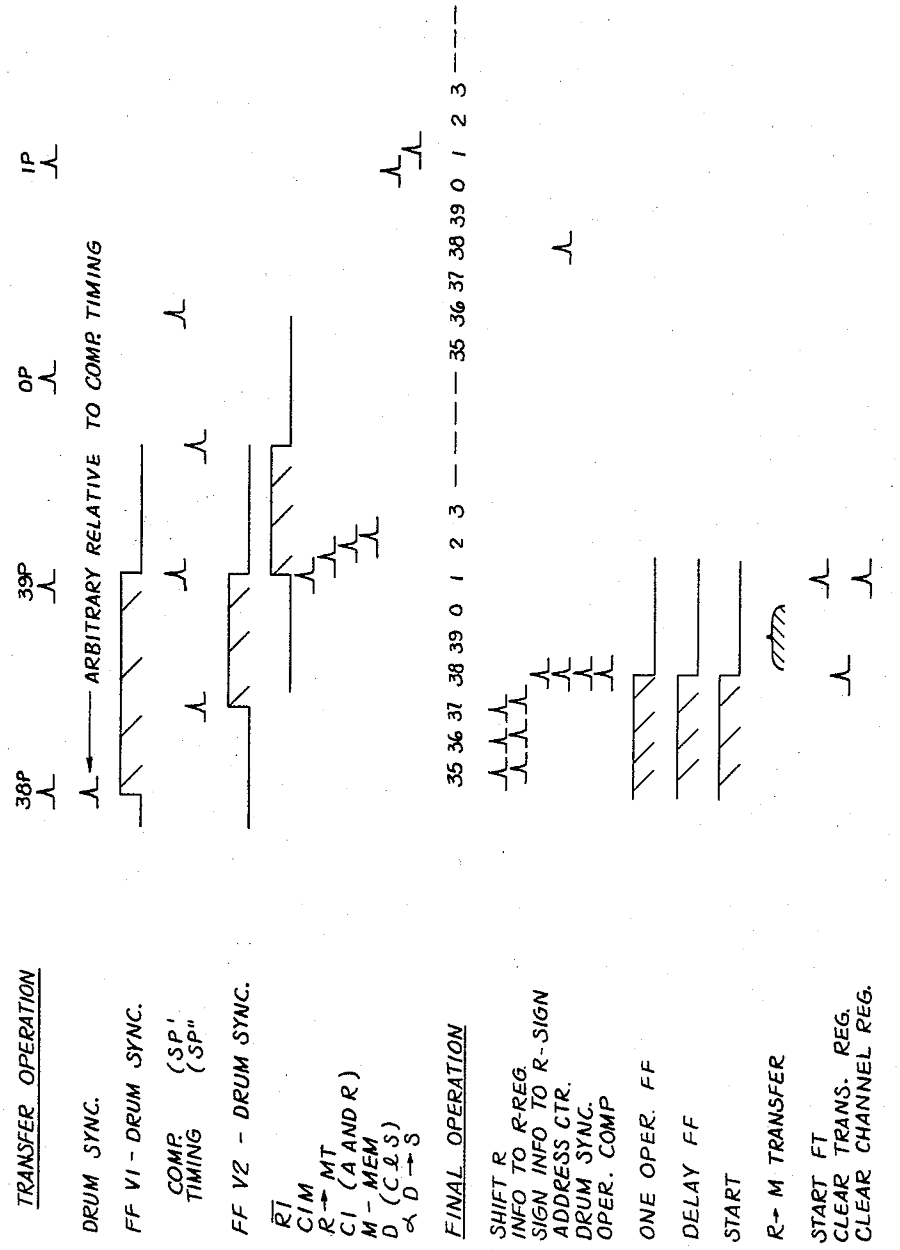

Figures 15 and 16 constitute a single graph of the timing wave forms for an input from the drum to the electrostatic memory, or a read operation.

Figure 17:
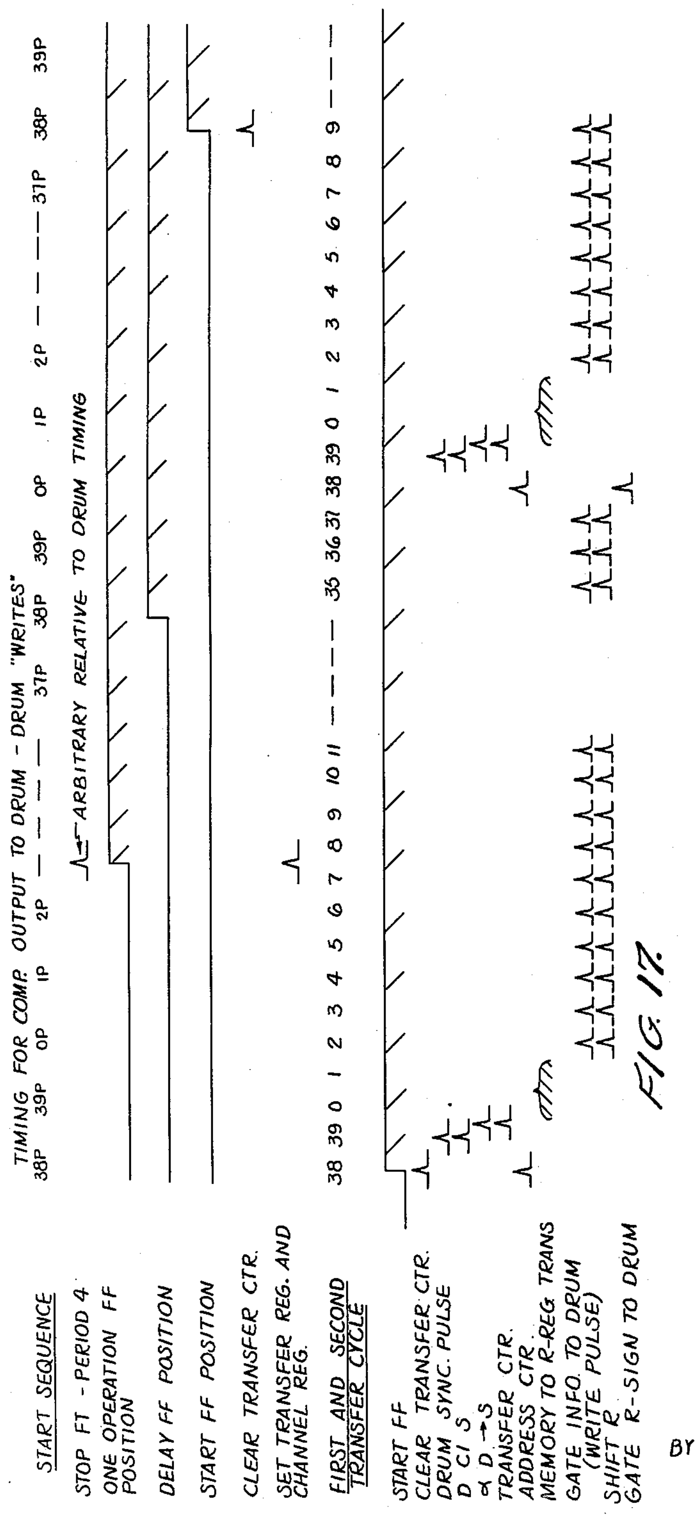
Figure 18:
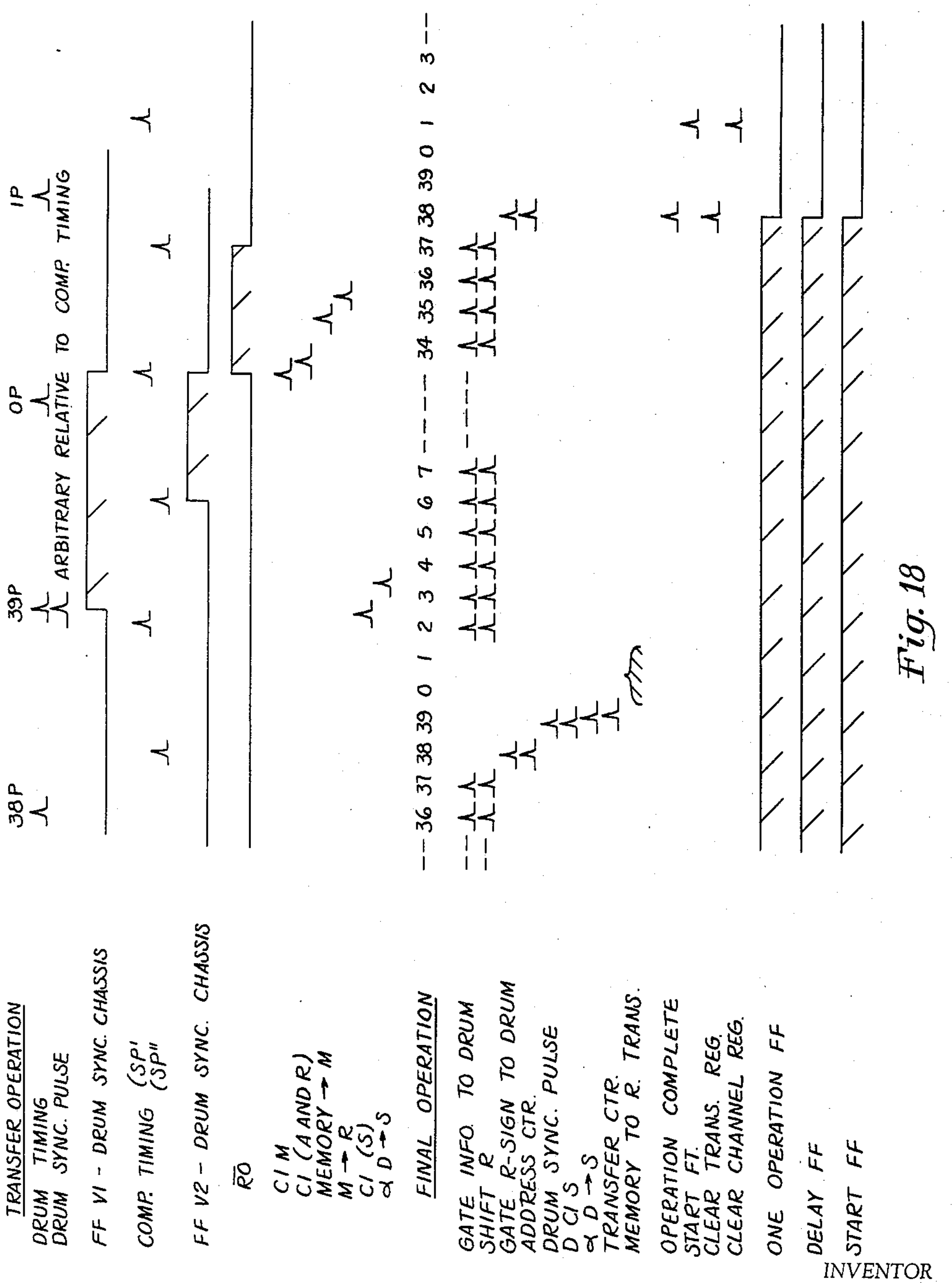

Figures 17 and 18 constitute a single graph of the timing wave forms for an output from the electrostatic memory to the drum, or a write operation.

Figure 19:
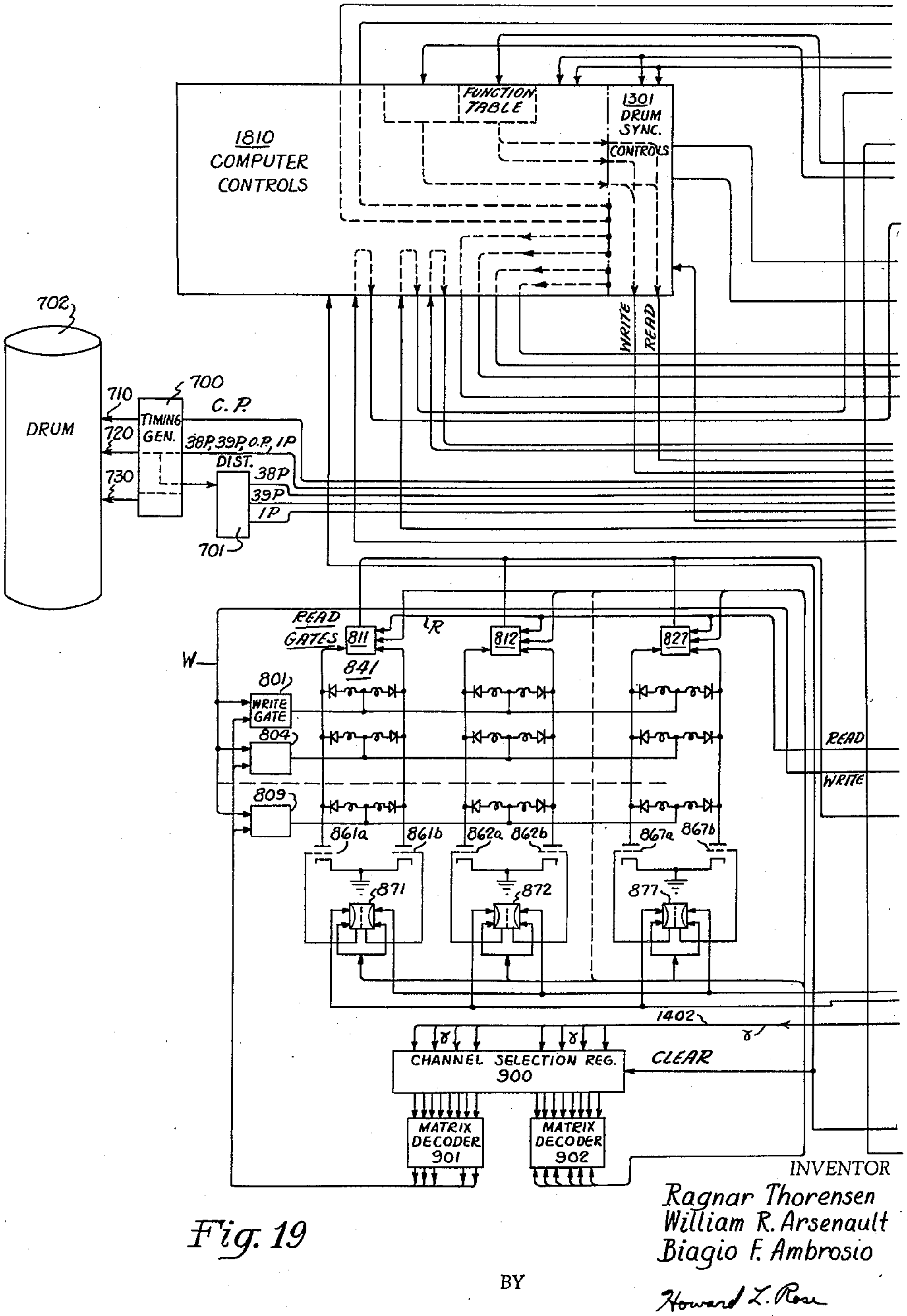
Figure 20:
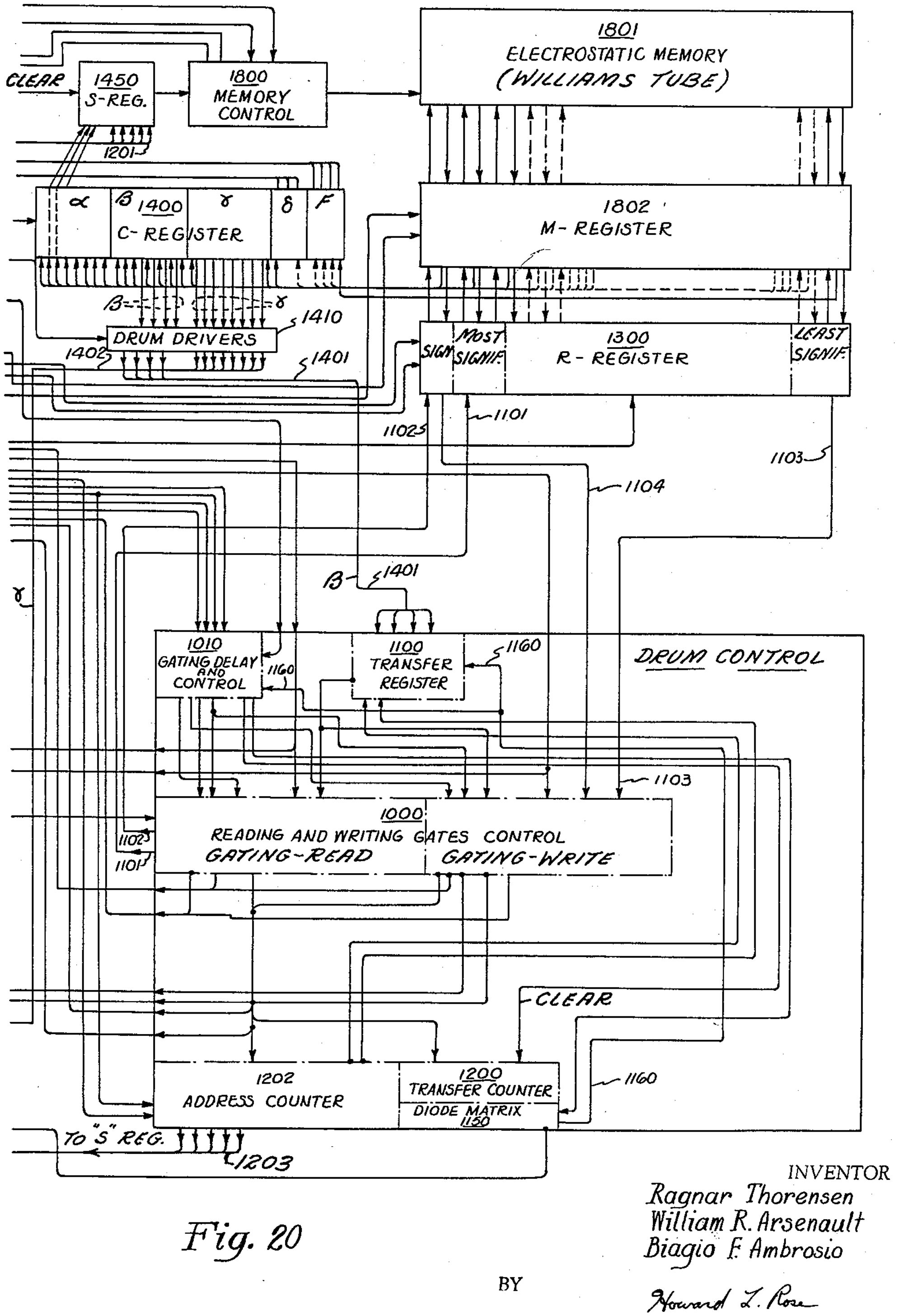

Figures 19 and 20 constitute a complete block diagram of the system of the present invention.

Figure 22:
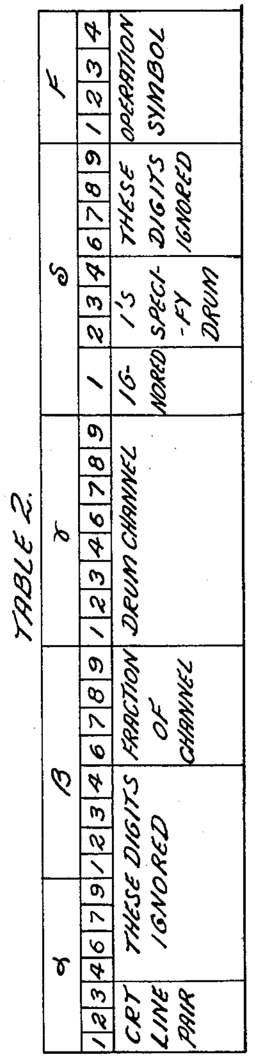

Figures 21 and 22 are tables illustrating the significance of a word when employed as an instruction in the C-register.

The magnetic drum of the present invention is an aluminum cylinder coated with iron oxide. It is rotated continuously at 3600 r.p.m. Information is stored on the drum in the form of small magnetized areas, magnetization of one polarity representing a binary zero and magnetization of the other polarity representing a binary "1." The information is stored around the circumference of the drum in channels, and as the drum is presently used, 1280 binary bits are recorded in each channel; these being divided into 32 words of 40 binary bits each which constitute a basic transfer block. There are a total at present of 128 information channels, thereby giving the drum a total storage capacity of 4096 words. Although each word takes up a space on the circumference of the drum equivalent to the area necessary to store 40 binary bits, only 37 of these are used in the information channels. The first 36 digits represent numerical information, the 37th digit the sign, while three of the consecutive areas are unused for reasons which will become apparent subsequently. In addition to the 128 information channels there are 3 timing channels known as sprocket or synchronizing channels in which timing and synchronizing pulses are permanently pre-recorded, these being used to control the drum circuitry during a drum operation. This is necessary, since the drum cannot operate synchronously with the computer, and therefore the computer controls are stopped during a drum operation. Each word manifests intelligence in coded form either in the nature of an instruction or a number. Any word may therefore be interpreted as either a word or a number, the interpretation depending on whether the word is channeled into the control unit where words are interpreted as instruction or into the arithmetic unit where words are interpreted as numbers.

The drum system of the present invention is arranged so that it can communicate only with the electrosatic memory system of the computer. The electrostatic system with which the drum memory is used can hold 256 words of information, each word containing 37 binary bits. The words are arranged in a raster of 16 lines and 16 columns on the face of the cathode ray tubes. Therefore one channel of the drum will hold as many words as two rows of the electrostatic memory, and the information is either taken from or sent to an adjacent pair of these rows. Then the line pair initially referred to by a drum command is always an even numbered line. Thus the line-pair in the electrostatic memory corresponds to a memory block in a drum channel. The selection of a particular line pair is under control of the programmer. However, the particular location within that line pair is under control of the drum system. That is, a one-to-one correspondence is set up between the magnetic drum memory channel and the line-pair of the electrostatic memory so that any word space on the channel corresponds to one and only one definite storage cell in every line-pair of each storage tube. Thus word space number 9 on the drum always goes to memory cell 9 of a particular line-pair.

The three timing channels on the drum provide three sets of pulses occurring at various intervals during the revolution of the drum. One track provides 1280 clock pulses which are derived from a continuous channel of recorded "1's." Therefore each of the pulses corresponds to the location of a binary bit in the information channels. The second track provides an origin pulse, which is derived from a continuous channel of recorded zeros with the exception of a single recorded "1." This signal represents the origin or arbitrary zero position of the drum and is displaced by a quarter of a cycle from the clock pulse. The third track provides word pulses which are a group of four pulses and a group of thirty-six pulses that appear during each word time. They are derived from a track recorded with four "1's" followed by thirty-six zeros, etc. Therefore the output from this channel is a group of four pulses repeating during each word time and a group of 36 pulses also appearing during each word time. The last three pulses of the group of four appear during the interval in each word where no information is recorded. The pulses in all of the channels last about one-half microsecond with an interval of thirteen microseconds between them.

The overall operation of the system will be described by referring to Figure 1. The electronic digital information processing machine or computer of known construction is represented in the left-hand portion of Fig. 1 and includes a control unit 1810 such as sequence programming unit, an "R" (Read) register 1300 for receiving and storing digital information read from the magnetic drum 702 during a "read" operation, an instruction register 1400, an address register 1450, an electrostatic memory device 1801 such as a Williams tube and an "M" register 1802 for temporarily storing the contents of the Williams tube. Information from the electrostatic memory 1801 is gated by the computer controls 1810 to a temporary storage register 1802, called the M-register. The S-register 1450 determines the address of the information to be read out. When an instruction is read out of the electrostatic memory it is passed by the temporary memory to the C-register 1400 where a particular instruction will designate the type of operation to be performed and what components of the computer are involved in this operation. As previously mentioned, there is no apparent distinction between an instructional command "word" and a numerical word. When a word is channeled into the instruction register 1400 however, the word is interpreted in an instructional sense. The instruction or "C" register 1400 comprises 5 compartments, namely, the $\alpha$, $\beta$, $\gamma$, $\delta$, and F registers, each of which serves a particular function as indicated in Table 1 shown in Fig. 21. That is, each word is a coded instruction which includes a plurality of address references corresponding to each of such compartments respectively. Each of the four Greek letters in the chart, in other words, represents an address while F signifies an operation. In a 40 digit "word" each address is represented by 9 binary digits respectively, while the remaining 4 digits in the word is used to determine the operation involved. If a drum command is indicated, the alpha part of the C-register will contain the information which designates the particular electrostatic memory line pair to be referred to. This information is contained in the first three locations of the alpha address, the last five locations of the alpha address in the C location being ignored during a drum operation. The last four digits of the beta address of the C-register determine the portion of the drum channel which is to be read out or written in. The entire gamma address is used to designate the drum channel which is to be selected. The second to fourth locations of the delta address specify that the operation is to be a drum operation and the F-address designates whether the operation will be a read or a write operation. Under the control of the $\beta$-address, as will be explained later, a complete channel of information may be written or read, or at the option of the programmer a half channel, either the first or second half may be read, or a quarter channel, either the first, second, third, or fourth quarter may be read. The addresses necessary for these various commands are shown in Table 1 in Fig. 21.

The make-up of the entire command in the C-register is shown in Table 2, Fig. 22. Table 2 clearly illustrates how a 40 digit binary word contains address information groups corresponding to the 5 compartments of the instruction register 1400. It will be noted that a 40 word digit will be distributed among the $\alpha$, $\beta$, $\gamma$, $\delta$, and F compartments in groups of 9, 9, 9, 9 and 4, respectively.

When a drum operation is indicated by the $\delta$-address, this information is gated into the magnetic drum memory control 15. At this point the operation of the computer controls 1810 is suspended, and the operation of the machine is now under the control of the magnetic drum memory controls.

The timing pulses from the timing tracks 20 of the magnetic drum 702 are continuously fed to the timing generator 700 regardless of whether a drum operation is taking place or not. One of each group of four word pulses derived from the third timing track is fed to the address counter 1202. Therefore the count in the address counter corresponds to the particular word under the heads in the information channels at all times. Since the words are similarly arranged in all 128 information channels, a single counter keeps track of all of the channels. That is, it synchronizes all of the transducer heads with like peripheral locations in each channel. The timing generator 700 also feeds various timing pulses to the magnetic drum memory controls to insure that all operations will be synchronized with the speed of rotation of the magnetic drum. Under the control of the drum memory controls, the three most significant digits in the alpha part of the C-register are transferred to the S-register, thereby designating the particular line pair in the electrostatic memory which will be referred to in the drum operation. The remaining five digits in the S-register are derived from the address counter 1202; five digits being necessary in the binary system to designate any one of the thirty-two possible locations. Since the address counter is advanced one as each new word passes under the head on the information channel, the address in the S-register which designates the particular location to be referred to in the line pair is kept current. It is this provision in the present invention which greatly reduces the access time to the magnetic drum, since it is not necessary to wait for a particular location on the magnetic drum to be reached before information can be read to or from the drum. The maximum waiting time for access to the drum is two word times and the minimum is one word time. This is because the gating delay and control (1010, Figure 10) insures at least a one-word time delay to allow the switching circuits to set up. The variation of the one to two word time delay is due to the asynchronism between the drum and the electrostatic memory. In going from the drum to the electrostatic memory—a reading operation—the information on the drum is read off serially and then gated into the electrostatic memory in parallel. It is obvious then that the reading from the drum must start at the beginning of a particular word so that only complete words are transferred. Therefore the maximum waiting time for access to the drum is two word times and not the time necessary for one complete revolution of the drum. As will be pointed out later, the access time per word is much less than one word time.

At the same time that the alpha part of the C-register is gated to the S-register the beta part of the C-register is gated through the drum controls 15 to the transfer register 1100. This register determines the portion of the drum channel to be transferred in a given operation. The transfer register is used to inhibit the information from the magnetic drum to the electrostatic memory or vice versa during an unselected portion of the drum period. If the first half of a channel is to be transferred, the output of the transfer register will hold the path from the drum to the memory open during the first half of the channel rotation, while it will close these gates during the second half of the channel rotation. The transfer register operates in conjunction with the address counter 1202 and therefore is independent of the location of the drum when the operation starts. Because of this the coder is always assured that the proper half of the channel will be transferred to or from the drum.

The gamma portion of the C-register address is gated through the magnetic drum memory control to the drum selection matrix and playback and recording circuits 10. The matrix chooses the head on the magnetic drum which is positioned over the channel to be communicated with. When a particular channel is chosen by the $\gamma$-address through the drum control, the information during a read operation is read in serial fashion into the R-register 1300 from the drum. The thirty-six recorded zeros in the word pulse channel which are gated to the magnetic drum controls by the timing generator, gate and shift the information being sent to the R-register from the magnetic drum. Immediately after each bit of information is received in the R-register, the whole register is shifted, leaving the first location open for the next bit of information to be received. When a full word of 37 binary information bits, composed of 36 information bits and one sign bit, has been received in the R-register, the timing generator gates one of the four "1" pulses in the word-pulse channel to the magnetic drum memory controls as shown by the timing diagram of Figs. 15 and 16. The controls send a pulse to the computer control 1810 to the R-register, and the information in the R-register is gated in parallel fashion into the M-register 1802. The M-register is then gated into the internal memory 1801 of the computer. The first word has been transferred, and the same operation is repeated for the second and successive words. These operations will continue until the transfer register 1100 indicates that all of the information that is to be gated has been gated. At this time the magnetic drum conrols inhibit the playback and recording circuits. However, the system will stay on drum operation until the transfer counter 1200 indicates that there has been a complete revolution of the drum. Therefore, regardless of whether a full, half, or quarter channel is to be transferred, the computer will stay on drum operation until there has been a complete revolution of the drum. When the transfer counter indicates that 32 words have been transferred, the magnetic drum controls send a finish signal to the computer control and the computer then proceeds with the computation.

On a write operation in which information is read out of the electrostatic memory to the magnetic drum memory, the sequence is substantially the same except that information is read into the R-register in parallel from the M-register and then read serially from the R-register onto the magnetic drum. As before, the operation of the address counter allows the writing cycle to start as soon as the drum is at the beginning of any word position.

Before a detailed description of the computer is attempted, the various logical symbols used throughout the drawings will be explained by describing the circuitry involved.

In Figure 2 there is shown a flipflop circuit which may be used in a number of ways in the control circuitry. Inputs to *b* and *c* to the flipflop are connected through the diodes 21 and 22 and resistor 23 to the grid 24 of the left-hand portion of the tube 26. These diodes and the resistor constitute an or-gate. One output is connected to the cathode side of these diodes, this being designated as terminal *a*. An input to the grid 27 of the right-hand portion of the tube is connected through diode 28 and resistor 29. This input is connected to the terminal *d* of the circuit. A second output is taken from the cathode side of the diode 28 at terminal *e*. The terminals *a* through *e* will be shown as such in the later wiring diagrams and will refer to the terminals shown in this figure. The operation of the circuit is as follows: If a positive pulse appears at *b* or *c*, the grid 24 will be driven positive and the left-hand side of the tube as seen from the cathodes will begin to conduct. This will cause the right-hand side of the tube to be nonconducting and therefore the *a* output will be high. On the other hand if a positive input signal appears at the input terminal *d* the right-hand portion of the tube will conduct. The circuit will flip and the left-hand portion wil be biased off. Therefore the terminal *e* will be high. Negative pulses cannot be used on the input, since they will not be passed through the diodes.

Referring to Figure 2A, there is shown the symbol used when the circuit is connected as a single-input flipflop. The shaded tube is a fully-conducting tube and indicates the zero state. As shown in Figure 2A the output *e* is low, indicating that the left-hand portion of the tube 26 is conducting. The two inputs *d* and *c* are tied together. Also *d* and *b* might be tied together. In either case, if the right-hand side of the tube is conducting, a positive pulse on *d* will have no effect upon the right-hand tube, whereas a positive pulse on *c* will start conduction in the left-hand tube and will cause the circuit to flip. Therefore, by applying the same pulse to *d* and *c*, the circuit will flip whenever a pulse is received. In this configuration, input *b* is used as a "Clear" input. If a signal is received on *b*, the right-hand portion of the tube conducts, and the output *e* is low. This, as shown in Figure 2A, is the normal state for the flipflop. The circuit may be used as shown in Figure 2B, in which separate pulses must be used to cause the circuit to flip from one state to the other. If the circuit is in the normal state, and it is desired to produce an output on terminal *e*, an input must be applied to terminal *d*. The terminal *c* is used to "clear" and has the same effect as terminal *b*. Therefore in this configuration separate pulses must be applied to the appropriate input to cause the circuit to flip.

In Figure 3 is shown a circuit diagram for the pulse gates which are used in the present invention. Three inputs to the circuit *a*, *b*, and *c*, are connected through their respective diodes 31, 32, and 33 to the resistor 34, which in turn is connected to the grid 35 of the tube 36. The plate of the tube is connected through the primary winding of the transformer 37 and through a resistor to B+. The diodes 31, 32, and 33, taken in conjunction with the B+ supply and resistor 34 constitute an and-gate, and therefore the grid 35 will be high when, and only when, a positive input appears at all of the terminals *a*, *b*, and *c*, which are connected in the circuit. If this condition is not met, the grid 35 is maintained at such a low bias that the tube cannot conduct, regardless of the conditions on the remaining grids. A pulse input is applied through the terminal *d* to the grid 38 of the tube 36. This pulse will be passed by the tube 36 if all of the inputs *a*, *b*, and *c*, which are connected, are high, otherwise not. The transformer 37 may be arranged to produce either a positive or a negative output when a positive input is received.

Figure 3A shows the designation of this circuit when a positive input produces a positive output. An "I" will be inserted in the square if the circuit inverts the signal. The output of this circuit is taken from the terminal *e*. The terminal *f* will be returned to ground or −40 volts, depending upon the bias required.

The read gates which are used in the present invention are shown in Figure 4. The circuit is nothing but a differential amplifier followed by an and-gate. Two inputs *a* and *b* are connected to the grids 41 and 42 of the left and right-hand sides, respectively, of the tube 43. Each of these tubes is connected through equal-sized resistors 44 and through a common resistor to a minus supply voltage. An input on the terminal *a* will cause the cathode of the left-hand side of the tube to become positive with respect to the right-hand side, and a pulse will be produced in the primary of the transformer 40, which is connected between the cathodes of the tube. This will cause a negative pulse to be applied to the grid 45 of the tube 46 by the secondary of the transformer 44. The inputs *c* and *d* to the grid 47 of the tube 46 are connected through diodes 48 and 49, which together with the B+ supply and the grid resistor constitue an and-gate. Therefore only when both inputs *c* and *d*, or the connected input if only one is connected, are high can the tube 46 conduct. As shown in the drawing, the plate of the tube does not have a plate resistor. However, as used in the circuit, the output of this gate, which is taken at the terminal *e*, is connected through a resistor, in the circuit which it feeds, to a voltage source. If the inputs *c* and *d* are high and the grid 45 is at its normal bias—that is, nothing on the inputs *a* and *b*—the output will assume a first level. If a negative pulse is received at the grid 45, the terminal *e* will swing positive, whereas if a positive pulse is received, the terminal will swing negative. Therefore in a system in which the present device is used, if the input to *a* is a positive pulse the output from *e* will also be a positive pulse, and therefore a binary "1" will have been read from the drum. On the other hand, if a positive pulse appears on *b*, a negative pulse will appear at *e* and a binary zero will have been read from the drum.

Figure 4A shows the symbol that is used for the read gate in the diagrams. The pulse inputs are applied at *a* and *b* and the gating voltages are applied at *c* and *d*. The output is taken at *e*.

Figure 5 is a wiring diagram of the D.-C. gates used in the present invention. Each half of the tube 51 and its associated elements constitute a separate and-gate. Inputs *a* and *b* are connected through the diodes 52 and 53 to the grid 54 of the left-hand section of the tube 51. The diodes 52 and 53 in conjunction with the resistor 55 and the B+ supply constitute an and-gate and therefore both inputs *a* and *b* must be high—or if only one is connected that one must be up—before the grid 54 will be driven positive. The output from the left-hand section of the tube is taken across the cathode resistor 56 and appears at the terminal *d*. The right-hand section of the tube 51 will produce an output across the cathode resistor 57 when both of the inputs *e* and *f* are high. These inputs are connected through the diodes 58 and 59 to the grid of the right-hand section of the tube 51. Therefore both inputs must be high before an output will be produced at the terminal *g*. The symbol for this circuit is shown in Figure 5A.

Figure 6:
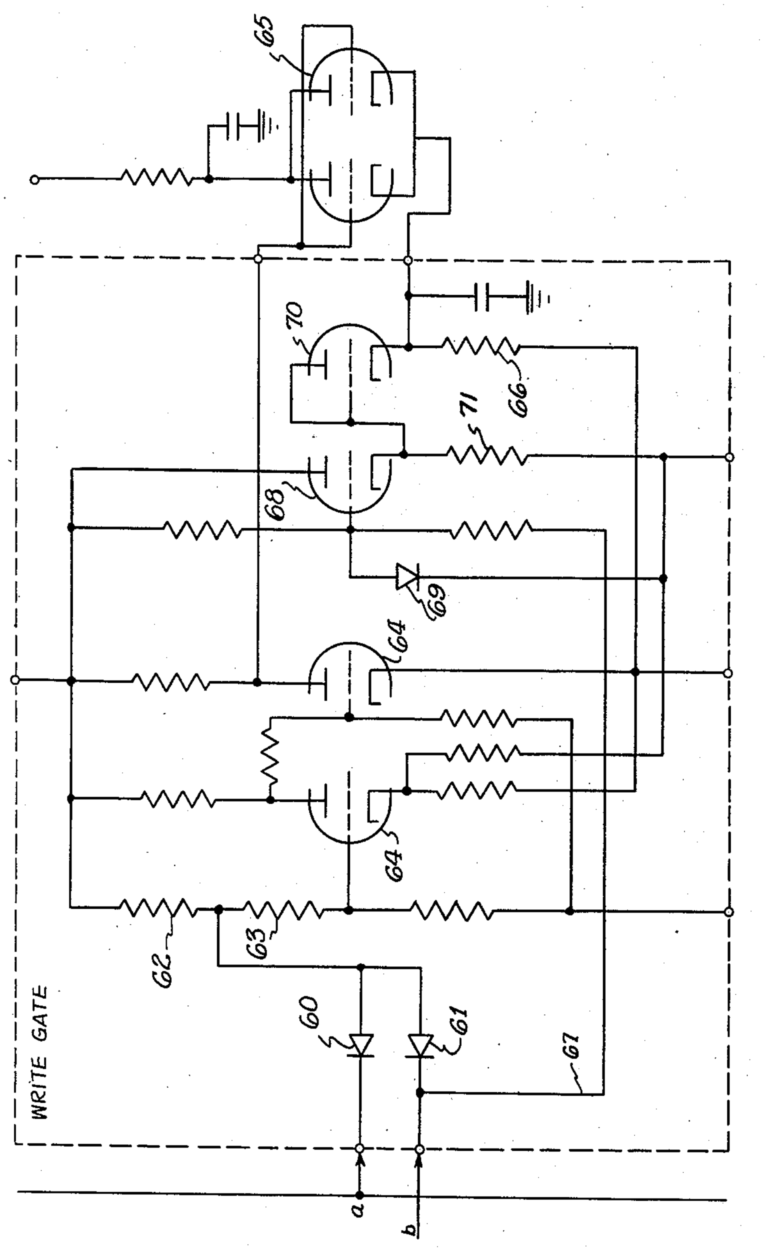
Figure 6 is a wiring diagram of the write gate of the present invention.

Figure 6 is a wiring diagram of the write gates which are used in the present invention. There are two inputs to this gate, being applied at the terminals *a* and *b*. Input *a* is connected through the diode 60 and input *b* is connected through the diode 61 to the junction of the resistors 62 and 63. The other end of resistor 63 is connected to the grid of the left-hand side of tube 64. The crystal diodes 60 and 61, resistor 62, and the B+ supply constitute an and-gate. If both inputs are high, the grid of the left-hand section of tube 64 will be high thereby causing the tube to conduct heavily. The output of the tube is connected to the righ-hand section of tube 64, and when the grid to the left-hand section is high, the grid of the right-hand section will be low. Therefore the output of the right-hand section of tube 64 will be high. The output of the right-hand section of tube 64 is connected to both grids of the two sections of tube 65, the two halves of this tube being connected in parallel. The cathodes of the tube 65 are connected through the resistor 66 to the B− supply and the output is taken across this cathode resistor. When the grid signal is high on the tube 65, the output voltage developed across the cathode resistor is approximately 180 volts positive. This is the "write" output of the gate. If the input *b* is high and the input *a* is low, a different output will appear across the resistor 66. The input *b*, besides being connected through the diode 61 to the grid of the tube 64 is also connected over line 67 to the grid of the tube 68. This grid is connected through the diode 69 to ground and therefore the input to this grid can never rise above ground potential. If the input *b* is high, a voltage is developed across the cathode resistor 71 of the tube 68, and this voltage is applied to the diode-connected triode 70. The resistor 66 is also connected in the cathode of this tube. Therefore, if the plate of the tube 70 is positive owing to conduction of the tube 68, a small voltage will be developed across the resistor 66 which will appear in the output of the write gate. This voltage is approximately +5 volts and is used during a read operation. If both inputs to the write gate are high, the voltage developed across the resistor 66 biases the tube 70 to cut-off, and therefore this tube cannot interfere with the voltage developed by the tube 65. It will be noted from the above description that when both inputs *a* and *b* are high, a large voltage is produced in the output. This is the condition when information is to be written onto the drum. If only the *b* input is high, the output is a small positive voltage, and this is the condition when information is to be read from the drum. If neither input is high, the output is maintained at a large negative voltage. This write gate is used at locations 801 to 809 in Figure 8.

The wiring diagrams of the various major components of the memory control circuitry are included in Figures 7–14. The diagrams are arranged so that a complete wiring diagram may be obtained by placing Figures 7–9 in a vertical column with Figure 7 at the top, putting Figures 10–12 in a second column to the right of the first column and with Figure 10 at the top, placing Figure 13 to the right of Figure 10 and placing Figure 14 to the right of Figure 12. All drawings are arranged horizontally. The first numeral or numerals in each component designation refers to the drawing in which the component will be found, the next-to-the-last number in the designation refers to the horizontal row of the drawing in which the component is located, and the last number in the designation refers to the vertical column in which the component is located.

Figure 7:
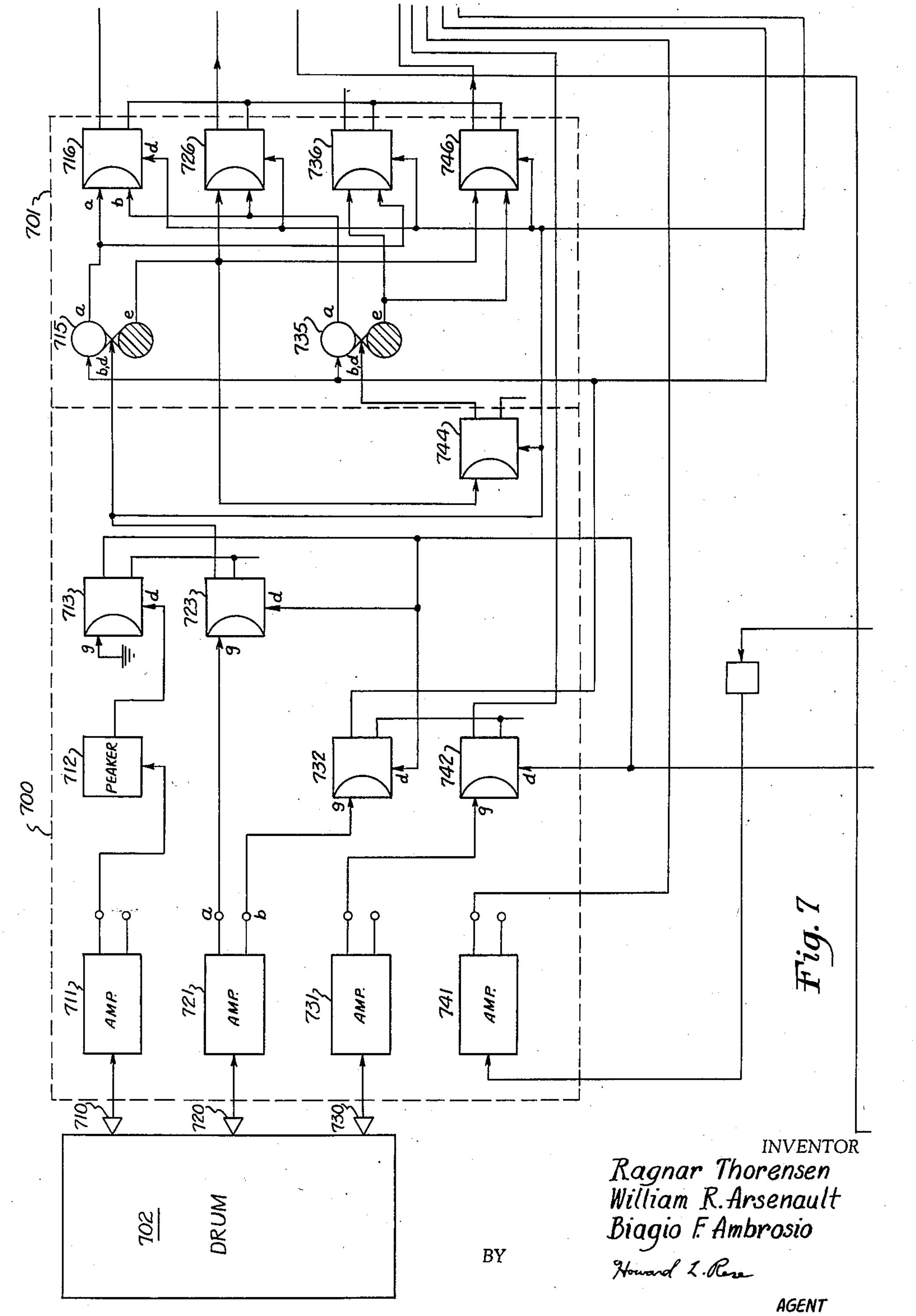

Referring to Figure 7, the drum 702 carries on it, as previously indicated, three timing channels. The clock pulses which are picked up from the drum by the head 710 in the timing generator 700 are amplified by the playback amplifier 711 and shaped by the peaker 712. The output of the peaker is fed to the *d* input of pulse gate 713. Since the input *g* of the gate is grounded, it will always pass pulses. The output of this gate is the clock-pulse ouput which, as will be described later, is used for a number of purposes throughout the circuit. The head 720 picks up the group-of-four word pulses in the timing word-pulse channel. This group-of-four pulses, which are generally designated as 38P, 39P, 0P, and 1P, appear on the output *a* of the playback amplifier 721. The group of thirty-six pulses which are recorded as zeros in the word-pulse channel appear on the output *b* of the playback amplifier 721. These pulses carry the designation of 2P to 37P. Both outputs of amplifier 721 are positive pulses. The *a* output of amplifier 721 is connected to the *g* input of gate 723. The *d* input of this gate is connected to receive clock pulses and therefore the output of the gate 723 is a group of four pulses which are shaped in accordance with the clock pulse and appear at the time 38P through 1P. The *b* output of amplifier 721 is connected to the *g* input of gate 732 which also receives on the *d* input a clock pulse. Therefore the output of the gate 732 is a series of pulses occurring at times 2P through 37P and they are shaped in accordance with the clock pulse. The head 730 picks up information from the origin-pulse channel on the drum 702 and feeds it to the input of the amplifier 731. The output of this amplifier is fed to the *g* input of the gate 742, the input *d* being connected to receive a clock pulse. Therefore the output of the gate 742 is a single pulse which designates an arbitrarily chosen zero position of the drum. The amplifier 741 is connected to receive the output of the information-channel heads and produces at the output a positive signal representing a binary "1." The output *b*, which might be used to produce positive signals to indicate zeros, on the drum, is not used in the present setup.

The pulses appearing on the output of the gate 723 are next separated in the distributor 701 so that outputs containing only a single one of these pulses may be obtained. The output of 723 is connected to the terminals *b* and *d* of the flipflop 715. The *e* output is normally low for this flipflop. The outputs *a* of the flipflops 715 and 735 are connected to the inputs *a* and *b* of the gate 716. The pulse input *d* of this gate is connected to the output of the gate 723 and therefore also receives the 38P through 1P pulses. As previously indicated, each pulse is approximately one-half microsecond long, with an interval between pulses of 13 microseconds. Owing to the inherent delay in the operation of the "and" circuit of the pulse gate 716, the 38P pulse at input *d* will be passed by the gate before removal of the gating voltage at the *a* input blocks the gate. However, the "and" circuit will operate before the next pulse, 39P, occurs. Therefore the second pulse cannot pass through the gate 716. However, the *e* output of 715 will now be high, and this in conjunction with the *a* output of 735 will gate the 39P pulse through the gate 726. The 39P pulse is gated through the gate 744, and the output of this gate causes the flipflop 735 to flip. The 39P pulse will also flip 715, and make the *a* output high again. Therefore when the 0P pulse occurs, both inputs to the gate 736 will be high, and this pulse will be passed through gate 736. However, at the present time the 0P pulse is not used in the circuitry of the memory system. However, the appearance of the 0P pulse will again flip the flipflop 715 and make the *e* output high. Therefore when the 1P pulse arrives at the gate 746, both of its inputs will be high and the 1P pulse will be passed to the output. The 2P to 37P pulses reset the flip-flops 715 and 735 so that they will be in the starting position when the next 38P pulse arrives. Together then the timing generator 700 and the distributor 701 produce the control pulses necessary for synchronizing all drum operations with the speed of rotation of the magnetic drum. In addition, the output of the amplifier 741 carries the information read from the various information channels on the drum.

The next major unit of interest is the channel selection register 900 and its associated decoder matrices 901 and 902. There are shown in Figure 9. The purpose of these units is to choose the proper read-record head (Figure 8) so that the information is written in the selected channel on the drum. The channel address is gated in parallel from the $\gamma$-address of the C-register 1400 over the 8-conductor cable 1402 to the staticizor flipflops 911–918 of the channel register 900. The flipflop registers 911–918 staticize the information delivered thereto from the $\gamma$ compartments of the instruction register 1400. The decoder matrix 901 senses the information in the flipflops 911–914 and selects one of the write-gates 801–809 in Figure 8. Since only eight write-gates are used, half of the outputs of the matrix 901 are unnecessary. If all of the flipflops 911–914 carry zeros—that is, remain in the state shown in the drawing—both inputs *e* and *f* of the gate 921 of the decoder matrix 901 are high and the output *g* of this gate is high. Also both inputs *e* and *f* of the gate 923 are high, and its output *g* is high. As the result, the inputs *e* and *f* to the gate 931 are high, and the *g* output is high. This output is used to indicate that no address has been gated to the flipflops storing the four most significant digits of the gamma address. When this occurs, information should not be gated to the R-register during the read cycle. Therefore, when the output of gate 931 is up, the signal is inverted in gate 1121 (Figure 11) and applied to the reading gates 1064 and 1066 to close them and thereby stop the flow of information to the R-register 1300.

Figure 8:
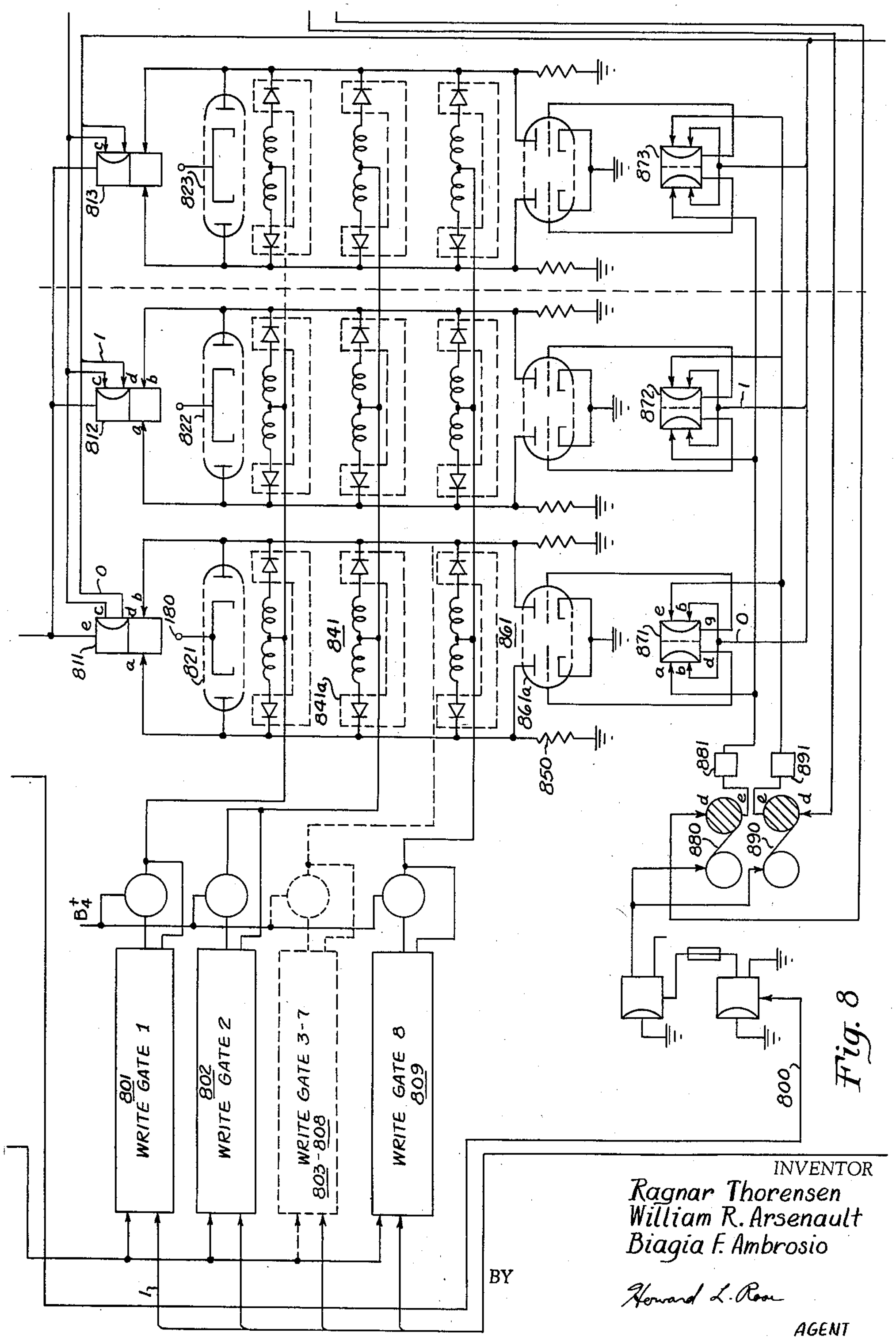
Figure 9:
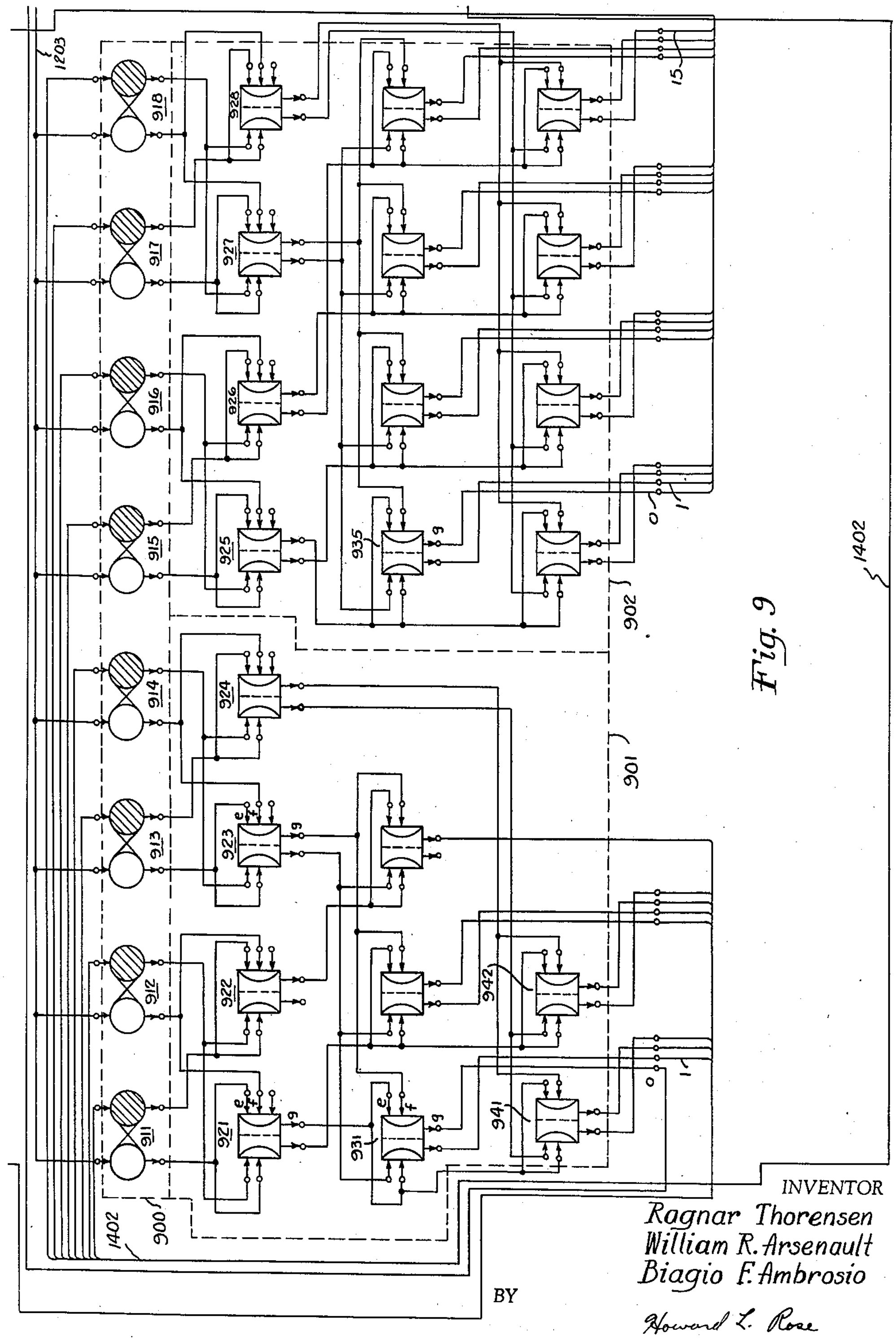
Figure 10:
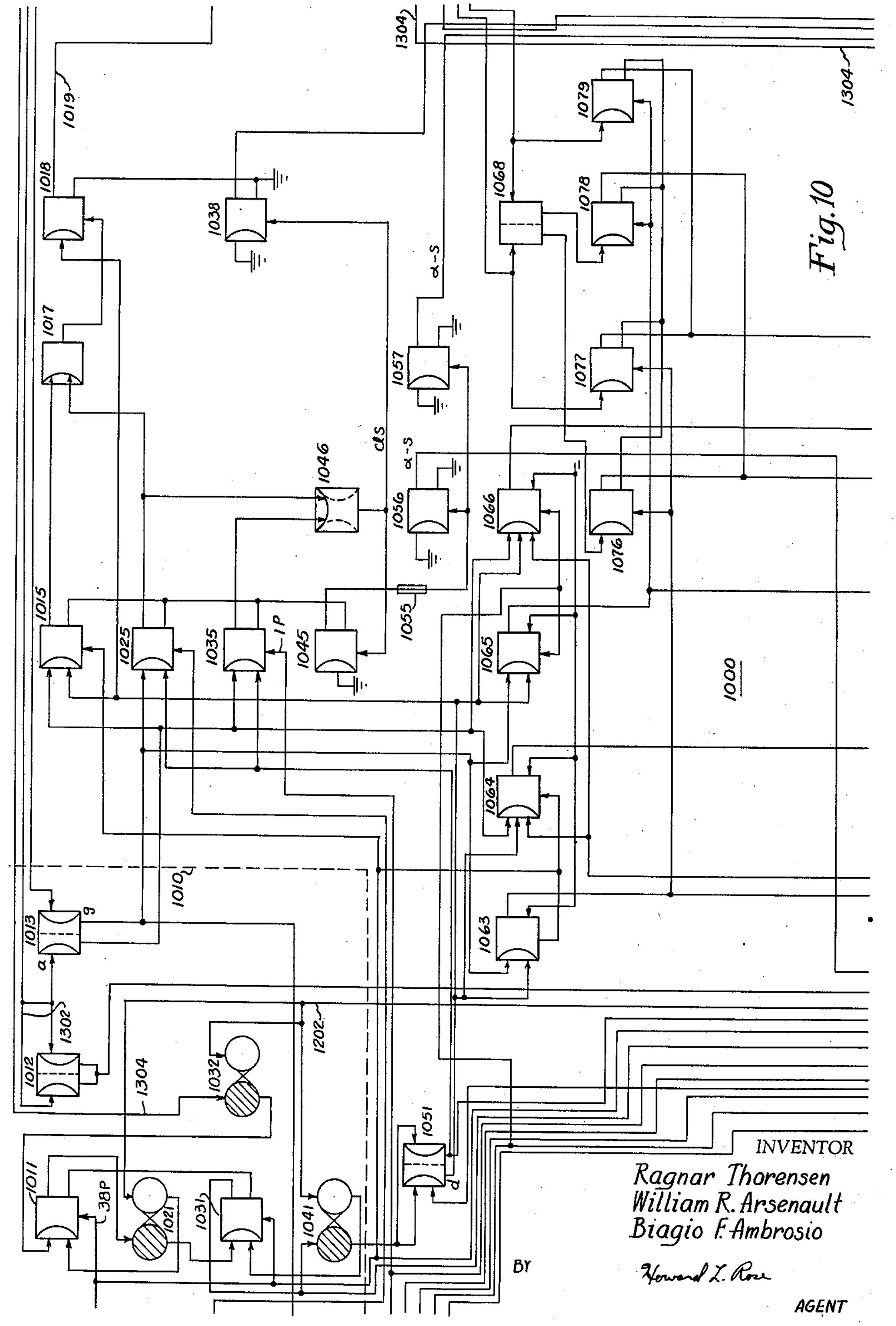

All of the outputs of the matrix 902 are necessary to select one of the 16 read gates shown in Figure 8, and therefore all address locations of the four flipflops 915—918 must be used.

Referring to Figure 8, the lead 0 from the matrix 902 is connected to the inputs *b* and *f* of the D.-C. gate 871. This zero lead from the channel register is also connected to the *d* input of the read gate 811. The No. 1 output of the right-hand section of the matrix 902 is connected to the appropriate inputs of the D.-C. gate 872 and read-gate 812. The outer outputs of this matrix are connected to the other gates as indicated in Figs. 8 and 9 so as to make it possible to select one of sixteen columns, only three columns being shown. Each column contains eight rows, only three being shown, and means are provided for choosing one of these eight rows by the output of the matrix 901. The No. 1 output of this section is connected to the selector input of the write-gate 801, and the other outputs through eight of the matrices are similarly connected to the other write-gates in the column. If a read operation is to be performed, the *c* input of the read gates 811—813, etc., which carries the "read" instruction signal will be high, and this in conjunction with one of the *d* inputs from matrix 902 being high will select the particular column in which the head of the channel to be read is located. The matrix 901 will choose a particular write gate, but the write input will be low, since this is a read operation. For the purpose of explanation, it will be assumed that the head 841 has been selected as the head to read. Each head is composed of two windings having a common terminal connected to the output of a write gate, in this case the write gate 802. Therefore, the common junction of head 841 will be at +5 volts as previously explained. Each winding is connected through a separate diode to different inputs of the selected read gate. The left-hand winding of the head 841 is connected through the diode 841*a* to the *a* input of the read gate 811. This diode is also connected through a high impedance 850 to ground and to the plate of the left-hand section 861*a* of the tube 861. However, this tube will be biased to cutoff and will represent an infinite impedance. The grid of the tube 861*a* is connected to the output *d* of the gate 871, which is low. Both the *b* and *f* inputs to the gate 871 are high, owing to the zero line from the channel register being the selected output. However, both the *a* and *e* inputs are low, since these inputs are connected to receive information only during a write period, as will be explained later.

If a positive pulse is induced in the left-hand winding of the head 841, owing to the orientation of the magnetized area passing under the head at a given instant, this pulse will be passed from the diode 841*a* to the input *a* of the gate 811. At the same time a negative pulse will be induced in the right-hand winding of the head and will be passed by its associated diode to the *b* input of the gate. The output of the read gate will be a positive pulse followed by a negative pulse; this being indicative of a binary "1." On the other hand, if a positive pulse is produced in the right-hand winding of the head 841, a positive pulse will appear at the *b* input of the gate 811. A negative pulse will also be induced in the left side of the head and this will appear at the *a* input of the gate. The output of the read gate will be a negative pulse followed by a positive pulse; this being indicative of a binary "0."

If a write operation is to take place the *c* inputs to the read gates 811, 812, etc. are low and no information will appear at the output of these gates. On the other hand a write input will apear at the second input to the gates 801–809, and the output of the selected gate will be approximately 180 volts. Assuming that the head 841 is the selected head, then the output of the write-gate 802 must be up and one of the outputs *d* or *g* of the gate 871 must also be high. The *b* and *f* inputs to the gate will be high, since this is the column selected by the matrix 902. Also either the *a* or the *e* inputs to this gate will be high depending upon the information to be written on the drum. These inputs are connected to the outputs of the flipflops 880 and 890, respectively. If a zero is to be written at a particular location a positive pulse appears on the *d* input to the flipflop 880, thereby raising the *e* output of this unit. This will cause the *a* input to the gate 871 to be high. When this occurs, the grid of the tube 861*a* will be raised, and the tube will represent a very low impedance to ground. Therefore a large current will flow through the left-hand side of the head 841, producing a magnetized area on the drum. If, on the other hand, a "1" is to be written at the location, the *d* input of flipflop 890 receives a positive pulse and the *e* input to the gate 871 is raised. As a result a large current flow will pass through the right-hand portion of the head 841 and will write a binary "1." The flipflops 880 and 890 are single-shot multivibrators which have a period of about 2.5 microseconds. However, the flipflops are positively returned to the zero state (to insure proper operation) by the clock pulses which are received over line 800 from the timing generator of Figure 7. The cathodes of the twin diodes 821, 822, etc. are returned to +180 volts and are used to prevent the back voltage across the diodes 841*a* from becoming excessive during the period when the field in the writing head is collapsing.

Figure 12:
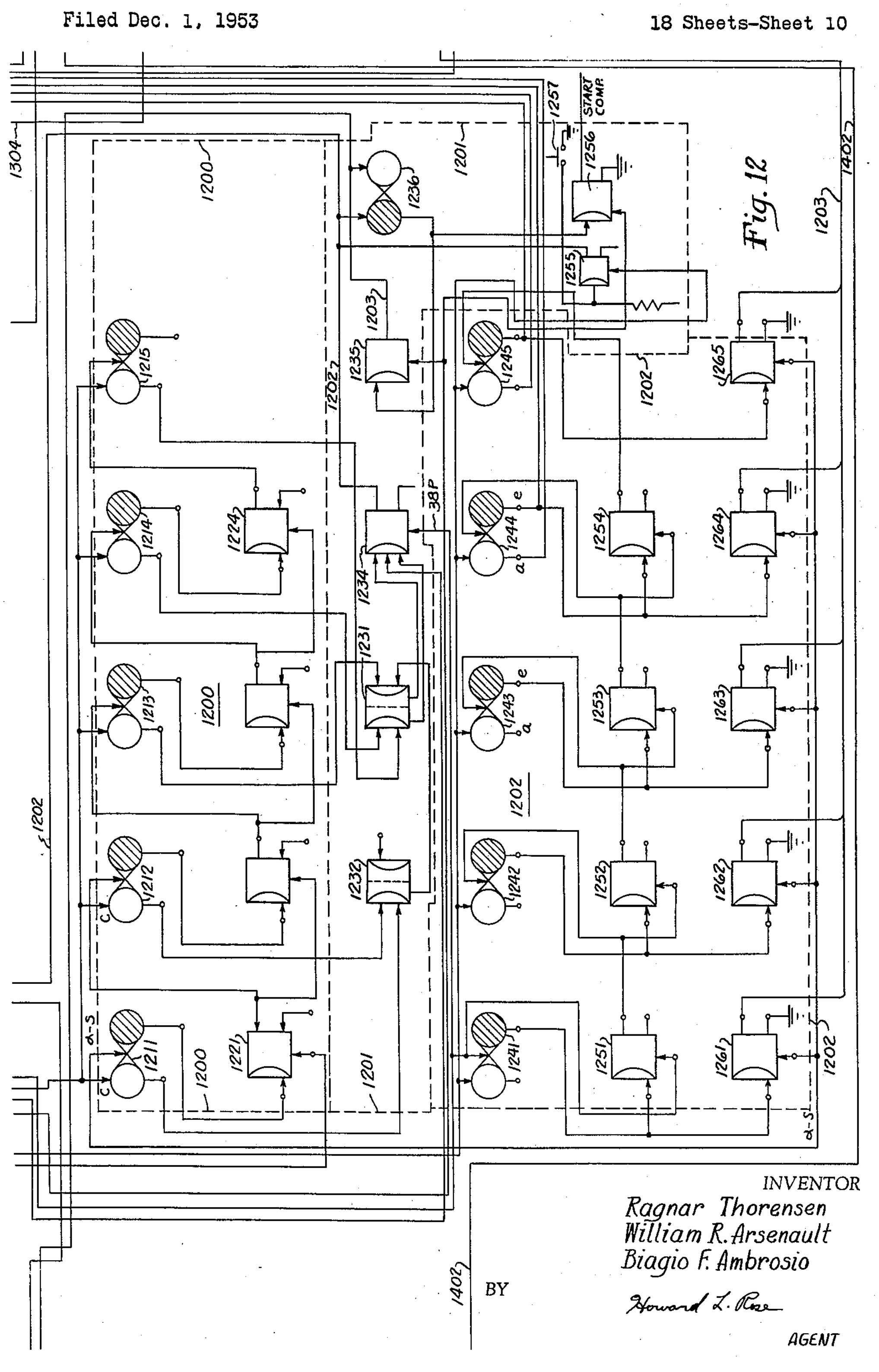
Figure 13:
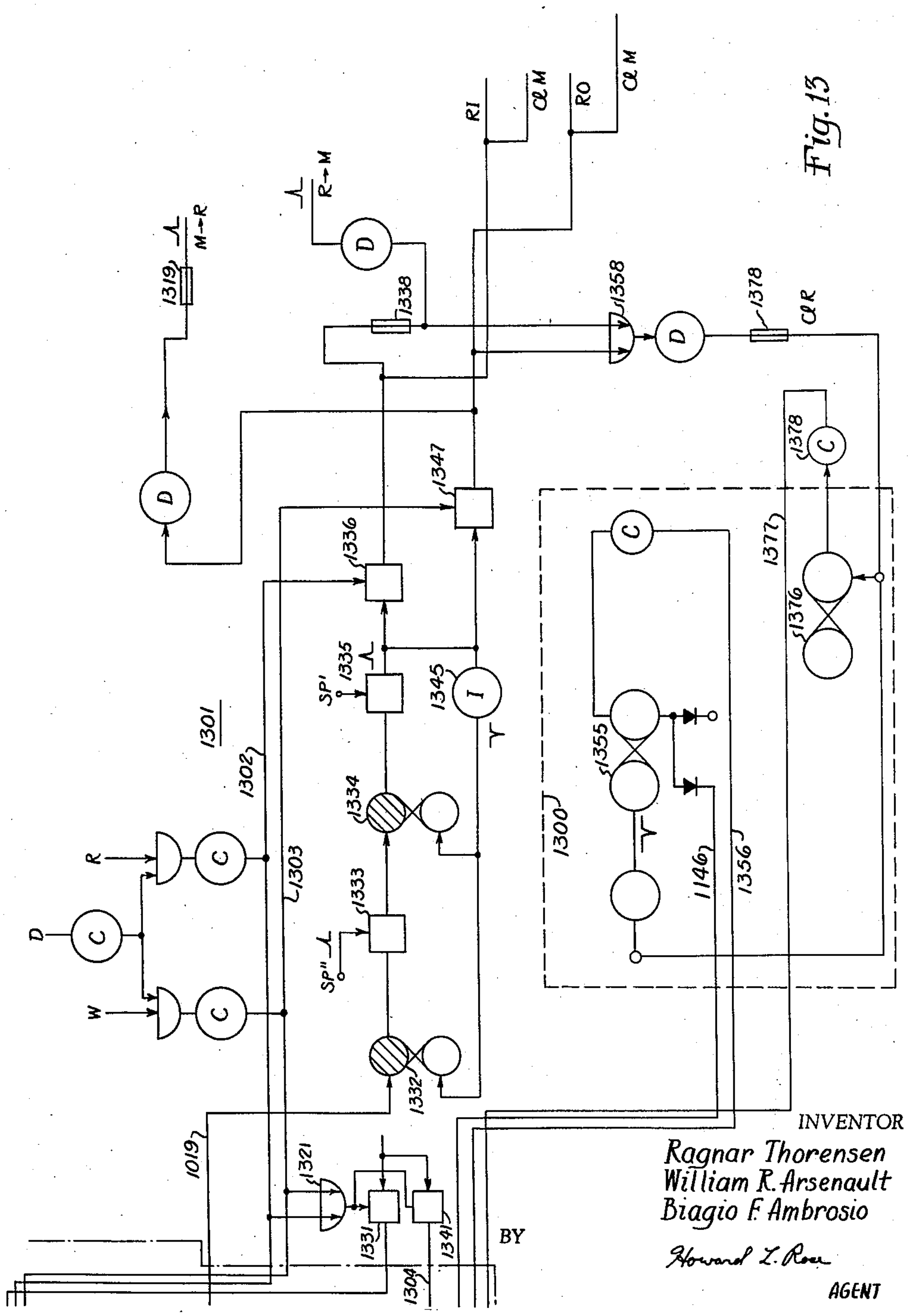

The address counter 1202 is shown in Figure 12. This counter is used to keep track of the thirty-two angular positions of the drum corresponding to the respective positions of the referred to 32 word bits occupying each channel. It is always connected to the output of the timing generator and therefore always contains the address of the word currently passing under the heads whether or not a drum operation is being performed. The count input is a 38P pulse which comes directly from the timing generator. The counter is reset initially by the origin pulse and should always register zero when succeeding origin pulses appear. This reset feature is necessary since, when the unit is initially turned on, there is no guarantee that all of the flipflops will assume their zero state. Reset pulses are used throughout this system for the same reason.

The counter consists of five flipflops 1241 through 1245 and the associated gates 1251–1254. Transfer gates 1261–1265 are utilized to gate the information contained in the counter to the S-register 1450 at the proper time. In the counter itself only one output of each flipflop is used. When a 38P pulse appears on the input, the flipflop 1241 is flipped. Owing to the delay in the gate the 38P pulse appearing at the pulse input to the gate 1251 is not passed. When the next 38P pulse occurs, the input to the gate 1251 is high, and therefore this pulse is gated to the input of the flipflop 1242. The second pulse also flips to flipflop 1241, closing the gate 1251. Subsequent appearance of the 38P pulse will produce similar effects throughout the counter thereby producing an output at the gate 1251 every other 38P pulse, at the gate 1252 every fourth pulse, at the gate 125 every eighth pulse, etc. The *e* outputs of the flipflops are also connected to the inputs of the transfer gates 1261–1265. The information carried in the flipflops is gated to the S-register 1450 when a gating pulse appears at the pulse inputs to these gates. If a flipflop is in the condition shown in the drawing, nothing will appear at the output of the gate when the transfer pulse occurs and the S-register in this particular location will be unaffected. It should be noted that this transfer is made in parallel from the address counter 1202 to the S-register over the five-conductor cable 1203. Any gate which is connected to the output of a flipflop in the "1" condition will pass a positive pulse to the S-register. The gates 1261–1265 carry the output addresses $\alpha 9$ through $\alpha 4$ respectively.

As previously mentioned, only the *e* output of each flipflop is required in the address counter. However, both the *a* and *e* outputs of the flipflops 1244 and 1245 are required in the transfer register for reasons to be explained subsequently.

Figure 11:
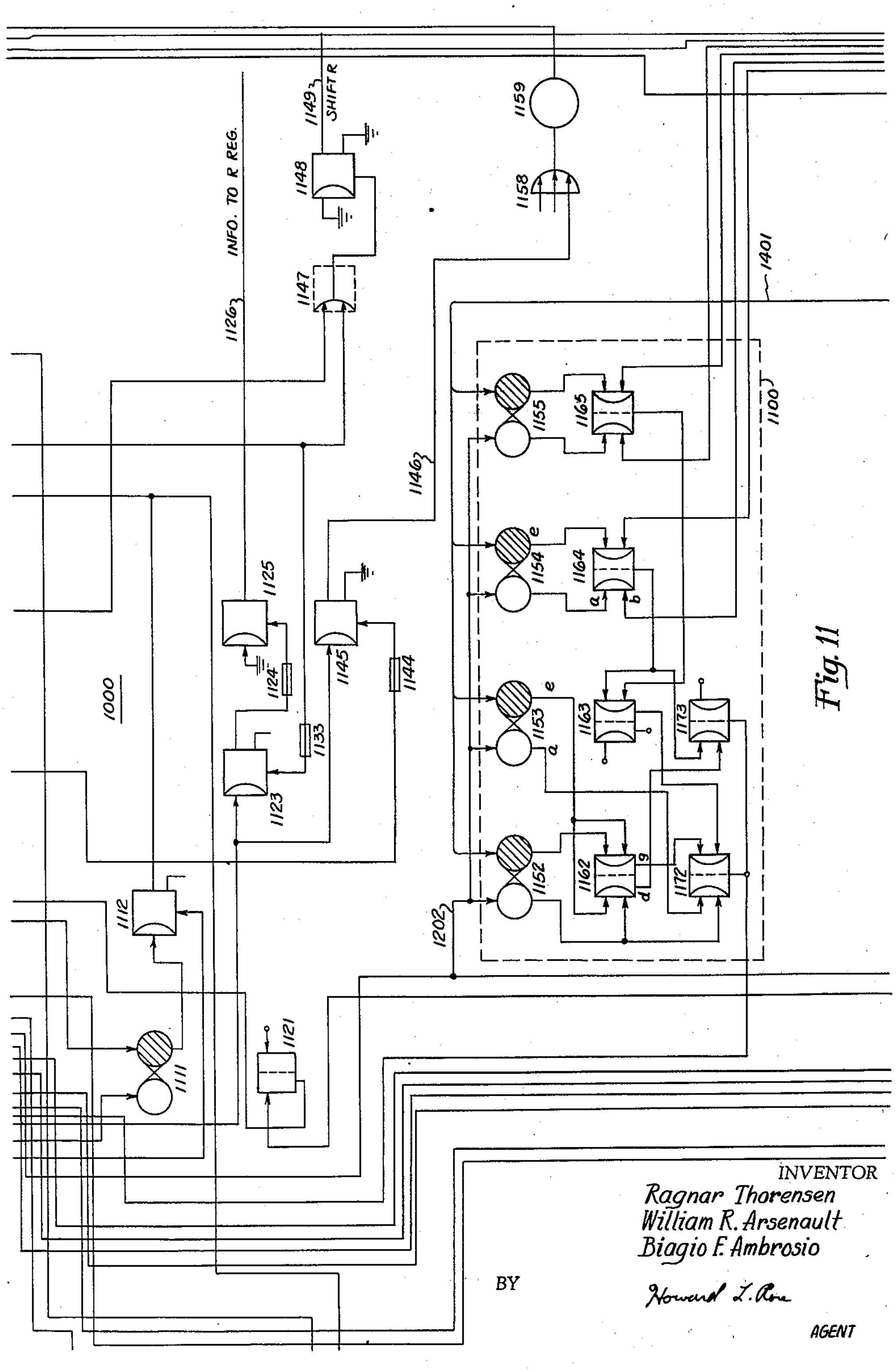

The transfer register 1100 shown in the lower part of Figure 11 consists of four flipflops 1152–1155 and the gates 1162–1165, 1172 and 1173. The register is used to give the operator a choice of transferring a full channel, a half channel, or a quarter channel of information, and also the choice of which half or quarter is to be transferred. The information for this register is transferred to the transfer register from the $\beta$ part of the C-register at the beginning of a drum operation. As long as the output from either of the gates 1172 or 1173 is high, transfer of information between the drum and the memory, in either direction, will take place. However, as soon as this output becomes low, transfer will cease. If a full channel is to be transferred, zeros will be written in the flipflops 1152 and 1153 which will produce an output from the D.-C. gate 1172 that will remain high regardless of the condition of the other two flipflops 1154 and 1155. If it is desired to transfer the first sixteen words of a channel, the address 0100 will be read into the transfer register. As a result the flipflops 1152, 1154, and 1155 will be in the condition shown in the drawing, and the flipflops 1153 will be flipped, making the *e* output high. When this address appears in the register the *d* output of the gate 1162 will be high, and this output is connected to the *b* input of the gate 1173. The *a* input to the gate is connected to the output of the gate 1164. The output of this gate will be high (when a zero is in the flipflop 1154) if the flipflop 1245 in the address counter is in the zero state—the *a* output high. This counter will remain in the zero state for the first sixteen words in the channel of the drum. From the seventeenth through the thirty-second word in the drum this flipflop will be in the "1" state, and the output which is connected to the *b* input of the gate 1164 of the transfer counter will be low. Therefore the only time there can be a coincidence of two of the inputs on the left-hand portion of the gate 1164, inputs *a* and *b*, is during the first half of the channel on the drum. During this period the output of the gate 1164 is high, both inputs to the gate 1173 are high and the output of the transfer register will also be high. Similarly, if the last quarter of the channel is to be transferred, all "1's" are written into the flipflops of the transfer register. At this time the output will be derived from the gate 1172. In order to produce an output from this gate the *g* output of the gate 1162 must be high. For the other input to the right-hand side of the gate 1172 to be high the output of both of the gates 1164 and 1165 must be high. For this to occur, the flipflop 1245 in the address counter must be in the "1" condition, and this in conjunction with the *e* output of the flipflop 1154 will raise one of the inputs to the gate 1163. The output of the gate 1165 will also be up, since both of the right-hand inputs to the gate will be high, one input being from the *e* output of the flipflop 1155 and the other input being from the *e* output of the flipflop 1245. Both of the flipflops 1244 and 1245 in the address counter will be in the "1" state; that is, their outputs will be high during the last quarter channel and therefore, if all "1's" appear in the transfer register, the output of the transfer register will be high during only the last quarter channel.

The transfer counter 1200, which is utilized to keep track of the number of transfers made during a particular drum operation, is shown in the upper portion of Figure 12. The counter starts with all zeros in the flipflop at the beginning of a drum operation. These flipflops are reset to the zero state by a pulse which is generated at the beginning of a drum operation by the gate 1031. It is stepped one count at the beginning of each transfer of a word either to or from the drum by the alpha-to-S transfer pulse, and at the end of a thirty-two count it again records all zeros. The counter itself consists of the flipflops 1211–1215 and the pulse gates 1221–1224. When all of the flipflops in the transfer counter register a zero, the *a* and *c* inputs to the gate 1234 are high. The *b* input, as will be shown later, is up during the entire drum operation, starting at a time slightly after receipt of the first 38P pulse after drum operation is indicated. Therefore the first 38P pulse occurring at the beginning of the drum operation will not be passed by the gate 1234. However, when all of the flipflops are again in the zero condition, the first 38P pulse appearing thereafter will be passed. The output of the gate 1234 indicates that 32 words have passed under the head of the drum and the operation is complete. This output clears the transfer register 1100 and takes control of the computer away from the drum controls (flipflops 1021, 1041, and 1022). This output also causes the flipflop 1236 to be flipped. When the next 1P pulse appears, it is gated through the gate 1235 to clear the channel register 900 and through the gate 1256 to produce a pulse which starts operation of the internal controls of the computer. The gate 1255 is provided to clear the registers when the direct current is initially turned on. The D.C. input to the gate may be grounded through a push button 1257 located with the computer's manual controls. When the next origin pulse appears at the pulse input to the gate 1257, the same sequence of events takes place as took place when a positive output appeared on the output of the gate 1234. The transfer counter therefore is used to keep track of the number of words transferred from or to the drum, and when a complete channel has been transferred, the drum operation is discontinued.

Figure 14:
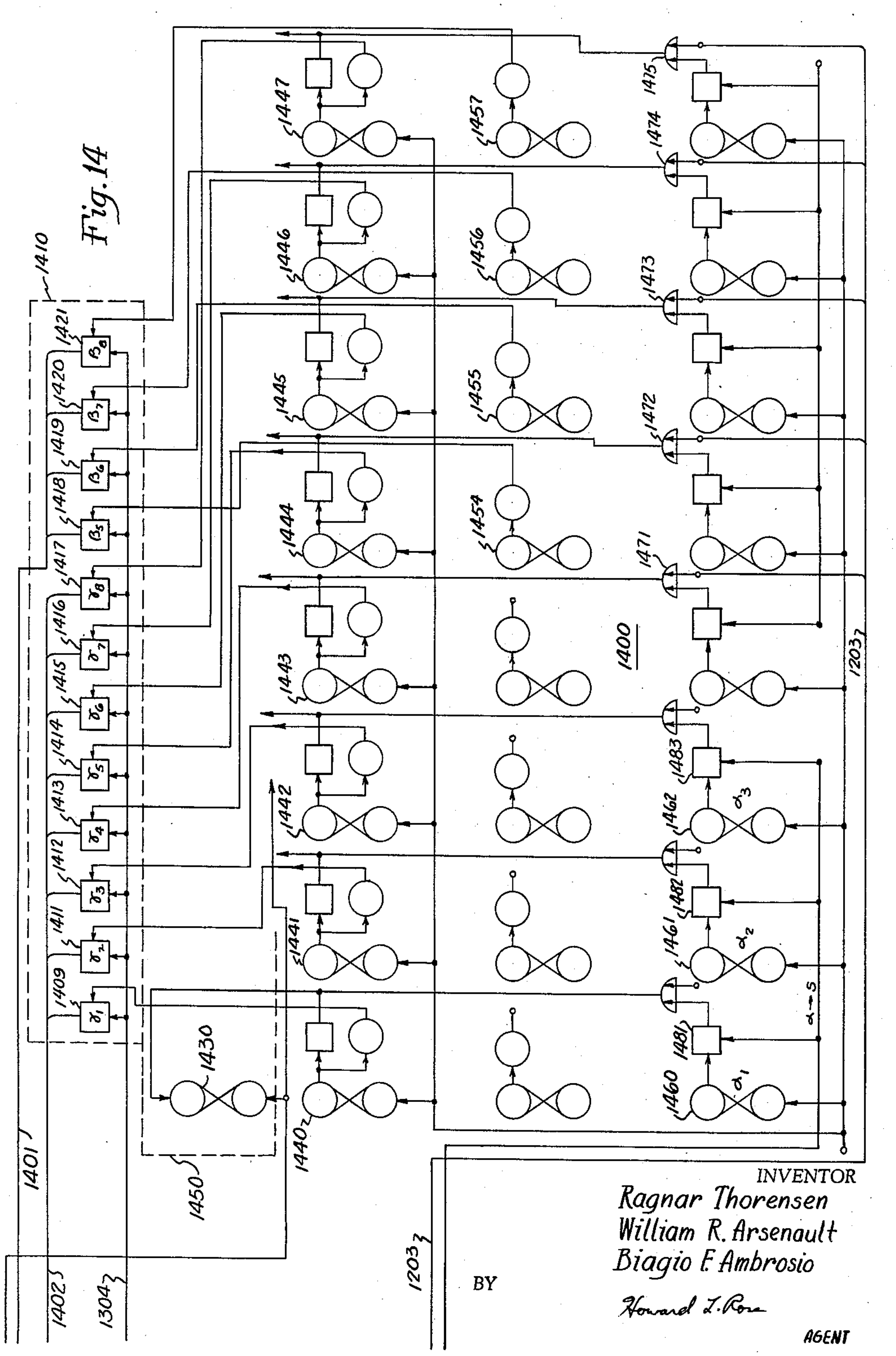

The C-register 1400, which stores the instruction from the computer, and the drum drivers 1410, which are used to transfer portions of the address in the C-register 900 to the channel register and transfer register 1100 are shown in Figure 14. In this drawing only the $\alpha$, $\beta$, and $\gamma$ portions of the C-register are shown, the $\delta$ and F sections being omitted. Only the first three numerals in the $\alpha$-register are of interest and these are contained in flipflops 1460, 1461, and 1462. The last five address locations of the C-register are of no interest in the drum operation. In place of these last five digits the information contained in the address counter is used. The three digits in the flipflops 1460–1462 are gated by a transfer alpha-to-S-register ($\alpha \rightarrow S$) pulse which is derived from the control circuitry of the drum system. This pulse is applied to the or-gates 1481, 1482, and 1483, the output of the gates being connected to various flipflops in the S-register 1450. As previously pointed out, the S register controls the address selected in the electrostatic memory. The address of the particular location in the line pair found in the address counter is also gated by $\alpha \rightarrow S$ pulse. This information from the address counter is fed to the last five locations of the address or S-register 1450 through the or-gates 1471–1475 and is corrected for each advance at the beginning of each word time. The last four digits in the $\beta$-register flipflops 1454-1457 are gated through the drum drivers 1418–21 to the transfer register over line 1401. The $\beta$-to-transfer-register transfer and the $\gamma$-to-channel-register transfer are initiated at the beginning of a drum operation. The information contained in the $\gamma$-address, which designates the drum channel to be selected, is gated to the channel register through the pulse gates 1410–17 over line 1400. This address is carried in the flipflops 1440–1447.

*Detailed description of a read operation*

In a read operation information is read in serial fashion from the drum and transferred in parallel to the electrostatic memory. When the proper address for a drum read command is received in the $\delta$ compartment of the C-register 1400, a pulse is produced that stops the operation of the control circuitry of the computer. However, the timing circuits of the computer continue to operate. This same pulse is applied to the and-gate 1341 of the drum synchronizer controls 1301 shown in Figure 13. Gate 1341 also receives an output from the or-gate 1321. The or-gate is connected to the lines 1302 and 1303 which are the "read" and "write" outputs respectively of the computer. If the operation is to be "read," line 1302 is high. Therefore the gate 1341 passes the "stop computer" pulse over line 1304 to the gates 1410 to 1421 in the drum driver control 1410. This is known as a beta-gamma ($\beta,\gamma$) transfer pulse and it gates the eight digits of the gamma part of the C-register and the four least significant digits of the beta part of the C-register 900 to the channel register 1100 and transfer register respectively over lines 1401 and 1402.

The proper channel is set up as soon as the channel register is set. Assume that channel 20 has been selected, address 00100000, and that the beta part of the command is 00; i.e., a full channel is to be transferred. The channel selection register 900 and its associated matrix decoders 901 and 902 raise the *g* output of the gates 941 and 935 and thereby select the write-gate 802 in position 2 and the read-gate 811 in position 0. Since this is a read command, the write-input into the write-gates is low, so that the output of 802 is approximately +5 volts. All other write gates have negative outputs. Both inputs to the read gate 811 are selected, since the *c* input is connected to receive a "read" signal from the gate 1012 in the drum delay chassis 1010. The gates 1012 and the *a* input of gate 1013 are drivers which are used to supply the read signal to a number of gates. All other read-gates 812–825 of the read-record head selection gates are cut off. This allows the signal developed in the read-record head in position 20 only to be passed to the information playback amplifier 741.

The stop pulse is also passed through gate 1331 in the drum synchronizer controls 1301 to produce a drum "start" pulse. This sets the one-operation flipflop 1032 (see Figure 10). The one-operation flipflop then opens the gate 1011 and allows the first 38P pulse (drum timing) following the start pulse to set the delay flipflop 1021. It is the purpose of this delay flipflop to delay the actual transfer of information for a minimum of one drum word time (approximately 520 microseconds) to allow time for the selection matrix to set up and the transients in the playback amplifier to die out. See Figures 15 and 16 for timing sequence of read operation.

The delay flipflop opens the gate in position 1031 and allows the second 38P pulse following the start pulse to actually start the transfer operation by setting the start flipflop 1041. It will be noted that both the delay flipflop and the start flipflop close the gates behind them as they are set, so as to allow only one pulse through. This second 38P pulse also clears the transfer counter 1200 being connected to the *c* input of flipflops 1211–1215. This reset operation may be necessary after the direct current is first turned on.

The start flipflop and the associated D.-C. gate 1051, along with the read signal from the D.-C. gates in positions 1012 and 1013 set up the proper gating for the transfer operation.

If both inputs to the left side of the gate 1051 are high, the output in conjunction with the read signal on line 1032 will open the gates 1015, 1064, 1066, 1123, and 1145 in the reading and writing gate controls 1000. The *d* output of the gate 1051 will be high only when the start flipflop has been actuated and the output of the transfer register is high. Therefore it can be seen that the transfer register controls the interval during which information will actually be transferred. The gate 1035 is also essential to the operation of the "read" cycle. However, the inputs are connected to receive a "read" signal and the *g* output of the gate 1051, which is high whenever the flipflop 1041 has been actuated. This gate, then, will pass the 1P pulse supplied to its *d* input each time it occurs regardless of the condition of the transfer register. As will be seen later, this is essential to the correct operation of the system. The gates 1018, 1038, 1056, 1057, 1125, and 1148 are used merely as drivers and are not essential to the gating functions of the controls.

At time 1P a "clear" S-register (Cl S) pulse originates at the gate 1035 and is applied to the "clear" inputs to the flipflops in the S-register 1450, for instance, flipflop 1430. Two microseconds later a transfer-alpha-to-S ($\alpha \rightarrow S$) pulse is produced in gate 1045. The two-microsecond delay is produced by the delay line 1055 in the output of gate 1045. Through the driver 1057, the pulse is applied to the gates 1460–1462 in the C-register 1400 and causes only the first three most significant digits of the alpha part of the C-register to be gated to the S-register. Through the driver 1056, a pulse is also applied to the transfer gates 1261–1265 to gate the information in the address counter 1200 to the five least significant digits in the S-register. This same pulse also produces a count in the transfer counter 1200, being fed to the input of flipflops 1211, this pulse thereby indicating that the first of the thirty-two transfers is taking place. It now becomes apparent why the gate 1035 must pass the 1P input pulse regardless of the condition of the output of the transfer register. The $\alpha \rightarrow S$ transfer pulse is the count pulse to the transfer counter, which counter must keep track of the number of words that have passed under the heads regardless of whether or not information is being transferred.

The thirty-six pulses, 2P through 37P, are used to shift the R-register 1300 and gate the information from the playback amplifier to the R-register. These are gated through the gate 1066 and driven through or-gate 1147 to driver 1148 to produce a "shift R" pulse on line 1149. These same pulses from gate 1066 are used to gate the playback of information at gate 1123. It has been found from experience that information is more accurately gated if the pulses 2P–37P are delayed slightly. This is the purpose of the one microsecond delay line 1133 preceding the input to gate 1123. The one microsecond delay line 1124 between this gate and the driver gate 1125 is to allow enough time for the R-register to shift before the next digit is set. The input to 1123 is from the amplifier 741, which amplifies the output of the recorder heads (Figure 8). The information after passing through 1123 and 1125 sets the $\alpha_1$ position of the R-register over line 1126. This shaft and information gating continues serially for the thirty-six digits. At the time 38P the sign is gated at 1145 and sets the R-register sign over line 1146. The sign flipflop 1355 and one information flipflop 1376 are all that is shown of the R-register. The flipflop 1355 receives the sign over line 1146 on a "read" operation and supplies it to the drum over line 1356 on a "write" operation. Flipflop supplies information to the drum over line 1377 on "write." The flipflop which receives information during read is not shown.

The first word has now been gated serially from the drum to the R-register 1300. It is now necessary to gate the information into the high-speed memory before the first digit of the second word passes under the read-record heads. This is the purpose of the three-bit gap between words on the drum. There is no information stored at time (or location on the drum) 39P, 0P, and 1P. This allows approximately thirty-nine microseconds to transfer the information to the high-speed memory.

At the same time that the sign was gated, the 38P pulse produced a drum synchronizer pulse from gate 1015 through the driver at 1018, to the drum synchronizer chassis 1301 over line 1019. This drum synchronizer pulse sets the flipflop 1332 which allows pulses derived from the computer timing generator to control the transfer from the R-register to the memory.

In the drum synchronizer chassis, when flipflop 1332 is set, the gate 1333 opens. The first SP″ computer pulse following the drum synchronizer pulse then passes through 1333 and sets the flipflop 1334 opening the gate 1335. Eight microseconds later, an SP′ pulse passes through 1335 and is gated with the read signal at gate 1336. This pulse clears the M-register (Cl M) produces a read-in (RI) pulse and after being delayed one microsecond by delay line 1338, this same pulse produces an R-register-to-M-register transfer ($R \rightarrow M$). The delayed pulse is also passed by or-gate 1358 and delayed an additional one microsecond by delay line 1378 and then produces a clear R-register (Cl R) pulse. The M-register-to-memory transfer ($M \rightarrow m_t$) happens automatically whenever the read-in signal is set. It occurs 2.7 microseconds after SP′.

The first word from the drum has now been put in the proper address of the high-speed memory as dictated by the address counter and the three most significant digits of the alpha part of the C-registers. The R and M registers have likewise been cleared in preparation for the second word.

The operation for the second word proceeds exactly as described for the first word. At time 1P a clear S pulse is generated and two microseconds later an alpha-to-S-transfer pulse is produced. Note, however, that at time 38P the address counter has advanced one count. The new address in the S-register is now one count greater. The second word, then, is put in the next succeeding spot in the line pair of the high-speed memory.

This alpha-to-S-transfer pulse also produces the second count in the transfer counter. The transfer counter continues to count with each succeeding word transferred for 32 words. At any time during the continuing operation the transfer register may indicate that no more information is to be gated. Acting through gates 1051, 1064, and 1066, the transfer register will cause the gates 1123 and 1145 to be closed for whatever part of the cycle is necessary to accomplish the desired results.

The transfer counter 1200 having started at zero will again register zero after the thirty-two counts. The decoding network 1201 associated with the transfer counter then opens the pulse gate 1234. The *b* input to the gate is high as long as the start flipflop 1041 is in the operating position. The opening of the gate occurs two microseconds after the 1P pulse of the last word and the final world must still be gated to the R-register. The last word is alternately shifted and gated by the 2P through 37P pulses as with the other words.

At the time 38P the sign is gated and the final drum synchronizer pulse is emitted from 1018. Also a 38P pulse gates at 1234 and produces an operation-complete pulse on line 1202. This resets the one-operation flipflop 1032, the delay flipflop 1021, and the start flipflop 1041, which in turn stops all transfer pulses. It also clears the transfer registers and sets the flipflop in position 1236. It is the purpose of this flipflop to delay the start pulse to the computer for three bit times (approximately 39 microseconds) in order to allow enough time for the final word to be transferred from the R-register to the high-speed memory. A 1P pulse is then gated through 1256 to produce a start-computer pulse. A 1P pulse is also gated through 1235 which resets flipflop 1236 and also clears the channel register over line 1203.

The computer takes over control now and completes the input command.

*Detailed description of a write operation*

In a drum "write" command (that is, transferring information from the electrostatic memory to the drum) the write-input line 1303 is high and the read-input line 1302 is low. When a stop-computer pulse is received at gates 1331 and 1341 it is passed, the output of or-gate 1321 being high, and a beta-gamma transfer pulse and a start-drum pulse are produced.

As with "read" the proper read-record head is selected by the channel register and its associated matrix. Again assume channel 20 is selected and that a full channel is to be transferred. The channel register matrix decoder 901 selects the write gate 802 in position 2 and the record tube 861 in position 0 via the D.C. gates 871 and 935. On "write" both inputs to the selected gate are high, the "write" input being driven positive by the *g* output of gate 1013, and the output therefore is approximately +180 volts. The output of all other write gates is negative, and all diodes except those associated with the selected gate are biased to cut-off. All of the sixteen selected read-record heads have 180 volts applied to them; however, since only the record-tube in position 0 is selected, the head in position 20 will be the only one to record.

The one-word time delay in starting the actual transfer operation proceeds as on a read command (see graph, Figures 17 and 18). The drum-start pulse from gate 1331 sets the one-operation flipflop 1032. The delay flipflop 1021 and the pulse gates 1011 (P38 pulse input) and 1031 introduce the one-word-time (drum timing) delay of 520 microseconds. The second 38P (drum timing) pulse following the drum-start pulse then sets the start flipflop 1041, which allows the transfer of information to start.

The start flipflop and the associated D.-C. gate 1051 along with the write signal from the *g* output of the D.-C. gate 1013 set up the proper gating for the transfer operation.

The 39P pulse following the setting of the start flipflop will pass through the pulse gate 1025. This produces a drum synchronizer pulse indicating that a word must be brought out of the high-speed memory to the R-register. It will be noted that the output of the transfer register acting through the D.-C. gate 1051 will prevent the passage of the 39P pulse through the gate 1018 unless the transfer register output is high. Therefore the transfer register again controls the gating of information to and from the drum. The drum synchronizer pulse produced at the output of the gate 1018 also produces a clear-S from or-gate 1046 through 1038 and two microseconds later a transfer-alpha-to-S pulse from gates 1056 and 1057. The pulse from gate 1057 transfers the information in the three most significant digits of alpha in the C-register to the three most significant digits of the S-register. The output of gate 1056 transfers the information in the five digits of the address counter to the five least significant digits of the S-register. It also steps the transfer counter to a count of one indicating that the first word is being transferred.

The S-register has now been set to the first address as dictated by the first three digits of alpha in the C-register and the address counter. The drum synchronizer pulse sets the flipflop 1332 on the drum-synchronizer controls, allowing it to read out the first word.

When flipflop 1332 is set it opens the gate 1333. This allows the first SP″ (computer timing) pulse following the drum-synchronizer pulse (drum timing) to pass through 1333 and set the flipflop 1334. This in turn opens the gate 15. Eight microseconds after SP″, an SP′ pulse passes through 1335.

On a "write" command this pulse gates through gate 1347 and produces a read-out (RO) signal, simultaneously clearing the M-register. Delayed one microsecond, it produces a clear-R pulse at the output of the delay line 1378. This one-microsecond delay is present owing to the necessity for such a delay on a read command. Whenever there is a read-out signal, a memory-to-M-register-transfer ($m \rightarrow M_t$) pulse is produced, 3.7 microseconds after the SP′ pulse. An M-to-R-register-transfer ($M \rightarrow R_t$) pulse is also produced but is delayed 5.5 microseconds by the delay line 1319. The $M \rightarrow R_t$ then appears approximately 1.8 microseconds after the $m \rightarrow M_t$ (see Figures 17 and 18).

As on a read command, there can be no action, either recording or reading, at the drum while information is being transferred between the M-register and the high-speed memory. This is the purpose of the information gap, 39P, 0P, and 1P, between words. The gap allows approximately 39 microseconds for a word to be transferred from the high-speed memory to the R-register.

The information during a write command comes from the least significant position flipflop 1376 of the R-register. A cathode follower 1378 drives the information directly to the pulse gate 1079 and through the right side of the inverter 1068 to the pulse gate 1078. The pulse gates 1078 and 1079 are gated by the output of the writing control gate 1065. The output of that gate is high during a write operation when the 2P–37P pulses are present. If the output of the cathode follower 1379 is up, a pulse is passed by gate 1079 which indicates a "record 1." If the output of 1378 is low, the output of inverter 1068 is high, and a pulse is passed by gate 1077. This indicates a "record 0." The pulse then sets one of the recording one-shot multivibrators 880 or 890 (Figure 8) which extends the one-half microsecond pulse to a two and one-half microsecond record pulse. This pulse is supplied by one of the cathode followers, 881 or 891, to all of the direct-coupled gates 871, 872, etc. in the selection matrix. Since only the D.-C. gate 871 in position 0 of the matrix is selected by the channel register matrix 902, the record-tube 861 is the only one to conduct current. One half or the other will conduct depending on whether a "zero" or a "one" is to be recorded.

This same 2P from gate 1065 that senses the R-register also shifts the R-register via the or-gate 1147 and the pulse gate 1148. This brings the next digit of the R-register into flipflop 1376. This is then sensed by a 3P pulse at gate 1078 or 1079.

The process of record and shift continues serially for thirty-six pulses. At time 38P, the sign is sensed at the pulse gate 1076 or 1077 by the output of gate 1063, depending upon whether it is positive or negative, and is recorded accordingly. The output of the gate 1063 also flips the flipflop 1111 which opens the pulse gate 1112 a short time after the 38P pulse. The pulse input of gate 1112 is connected to receive the 38P–1P pulses and will pass the 39P–1P pulses, the delay in the flipflop blocking 38P. The output of the gate 1112 in connected to the "record 0" line and therefore causes zeros to be recorded in the 39P–1P times. This recording in the gap is used to improve the frequency characteristics of the playback signal. It was found that the gating of the first digit of a word was more reliable if there was a signal present in the amplifier at all times rather than have no signal during the gap time.

At time 39P the second drum-synchronizer pulse is emitted from gate 1025, indicating that the second word is to be read from the high-speed memory. Also a transfer-alpha-to-S ($\alpha D \rightarrow S$) pulse is produced. Since the address counter was advanced at time 38P, the information to the S-register will be one count higher (unless the address counter has carried back to zero). The transfer counter is also advanced one count by the $\alpha D \rightarrow S$ pulse, indicating that the transfer of the second word is taking place.

The drum-synchronizer pulse sets the flipflop 1332 in the drum-synchronizer chassis. In the same manner as described above, the second word is read from the high-speed memory to the R-register. The second word is now ready to be recorded serially on the drum.

After thirty-two words have been transferred in this manner, the transfer register is a zero state. As on a read command, a pulse at time 38P is gated through gate 1234 and produces an operation-complete pulse. This resets the delay, start, and one-operation flipflops and also clears the transfer register. It also sets the flipflop 1236, allowing a 1P pulse to produce clear-transfer-register and start-computer pulses.

The start pulse allows the computer to resume control of the operation.

Figures 19 and 20 constitute a complete block diagram of the present invention and give a complete picture of the routing of information in the system. It will be noted that the read-in, read-out, clear-M, etc. pulses are all generated in the computer controls 1810 of which the drum-synchronizer controls 1301 are also a part. The read-in and read-out pulses go directly to the electrostatic memory control 1800 which controls the transfer of information from the internal memory 1801 to the M-register 1802. The various clear and transfer pulses are connected to the appropriate registers. The delta and F addresses of the C-register are gated to the decoders 1803 and 1804 respectively, which produce the drum (D) and read (O) or write (I) signals to the drum-synchronizer controls.

It can be seen from the above description that the present invention provides a system in which over-all access time to the drum memory is held to a minimum. Actual operating experience with the system has shown that, although the electrostatic memory system is 500 times as fast as the drum system on a word-for-word basis, the present system has reduced this difference to a ratio of 16 to 1. From the above it becomes obvious that the access time per word is much less than one word time. Also the system allows a great deal of flexibility to the programmer in that he can choose various portions of a channel rather than having to take a whole channel at a time.

The present invention has been described as being used with an electrostatic memory system. However, it is obvious that any high-speed parallel storage system may be used. Also the repetition rates of the present system may be increased, depending upon the diameter of the drum and the speed at which it is driven.

It will be apparent that the embodiments shown are only exemplary and that various modifications can be made in construction and arrangement within the scope of my invention as defined in the appended claims.

What is claimed is:

1. In an electronic digital computer having an internal computer control and an instruction register a magnetic memory system, comprising a rotating member having a magnetizable surface on which magnetic flux patterns may be induced to represent information, a plurality of magnetic transducing means positioned so that each of said transducing means scans a separate channel on said rotating member, at least one channel containing timing signal magnetic flux patterns, one of said transducing means positioned to intercept the timing signal flux patterns, first means for producing a first signal indicative of a read operation and a second signal indicative of a write operation, means for selecting and identifying either a half, or quarter, section-length, a channel on said write or read transducing operations are to be performed comprising, an address counter responsive to the timing signals and a transfer register responsive to the signals from said instruction register and said address counter for controlling flow of information to and from said transducing means, selection means for selecting one of said transducing means for a transducing operation, second means responsive to said first means and said selection means for applying a bias voltage to said transducing means, said second means producing a first bias for a read operation and a second bias for a write operation.

2. A magnetic drum memory system for electronic computers having an internal high-speed parallel memory and a computer control mechanism including controls for said memory, comprising a rotatable drum having a magnetizable periphery on which magnetic flux patterns may be induced, means for controlling the rotation of said rotatable member, a plurality of magnetic transducing means positioned so that each of said transducing means scans a separate circumferential channel on the periphery of said rotatable drum, a plurality of timing channels containing magnetic flux patterns having predetermined spacings, a different one of said transducing means positioned to intercept the magnetic flux in each of the timing channels to produce timing signals, the remaining transducer means being positioned over adjacent information channels respectively, means for rendering the transducing means associated with the information channels normally inoperative, matrix means for producing signals for selecting one of said transducing means for a transducing operation, first means for producing a read voltage indicative of a read operation and for producing a write voltage indicative of a write operation, second means responsive to the output of said matrix means and said write voltage to apply a first bias voltage to a selected plurality of said information transducing means to render said transducing means operative to pass signal voltages induced therein by the magnetic flux in its associated channel, gate means responsive to an output of said matrix means and the output of said first means to pass the voltages induced in only one of the operative transducing means, said second means being further responsive to the output of said matrix means and the write signal to apply a second bias voltage to a selected plurality of said information transducing means to render said transducing means operative to pass currents of sufficient magnitude to induce magnetic flux on said rotatable drum, third means for producing a signal indicative of the information to be written on said drum, means responsive to a second output of said matrix means and of said third means to cause current flow through only one of said transducing means in a direction indicative of the information to be stored, address means responsive to said timing signals to store the address of the portion of the channels on said rotatable drum currently passing under said transducing means and means responsive to said timing signals to gate the information in said address means to the controls of said internal memory where it is used as part of the address of the location in the internal memory to which referral is to be made.

3. The invention according to claim 2 including register means for storing the address of the portion of the channel of the rotatable drum to be referred to, and fourth means responsive to the information in said register and said address means to produce a transfer signal when a portion of the rotatable drum to be referred to is passing under said transducing means.

4. The invention according to claim 3 including read-information gate means responsive to the read signal, the transfer signal and the timing signals to pass information signals induced in said transducing means, and a register for receiving the output of said read-information gate means.

5. The invention according to claim 4, including control means for producing a synchronous signal when said register is full during a read operation and fifth means responsive to the synchronous signal and the read signal to cause the controls of the internal memory to transfer the information in said register to the internal memory.

6. The invention according to claim 5 in which said control means produces a synchronous signal when said register is empty during a write operation, said fifth means being responsive to the synchronous signal and the write signal to cause the internal memory to transfer information to said register.

7. The invention according to claim 6 including write-information gate means responsive to the transfer signal, the write signal and the timing signal to pass the information in said register to said third means in serial fashion.

8. The invention according to claim 7 including means responsive to said timing signals for indicating when said rotatable member has made a complete revolution after the start of the transfer of information.

9. The invention according to claim 8, including means responsive to said last-mentioned means to stop the operation of the drum memory system and return control to the computer.

10. In an electronic digital computer having an internal Williams tube memory in which information is stored in the form of raster lines, an internal computer control and an instruction register and means for transferring information words from the internal memory into said instruction register, the combination of an external rotatable magnetic drum information storage device having at least one circumferential synchronizing channel provided with pre-recorded precisely time-spaced synchronizing pulses and a plurality of circumferential information storage channels, an address counter energized by the output of said synchronizing channel to continuously indicate the circumferential displacement of the drum relative to a fixed datum, means for selectively identifying each of said plurality of information storage channels with a particular line-pair in said raster, the information stored in each of said storage channels comprising a plurality of transfer word blocks corresponding to a like number of discrete information cells on said line-pair, and means for correlating a particular cell in said selected line-pair with a corresponding word block in the respective channel identified with said line-pair.

11. In an electronic digital computer having an internal Williams tube memory in which information is stored in the form of raster lines, an internal computer control and an instruction register and means for transferring information words from the internal memory into said instruction register, the combination of an external rotatable magnetic drum information storage device having at least one circumferential synchronizing channel provided with pre-recorded precisely time-spaced synchronizing pulses and a plurality of circumferential information storage channels, an address counter energized by the output of said synchronizing channel to continuously indicate the circumferential displacement of the drum relative to a fixed datum, means for selectively identifying each of said plurality of information storage channels with a particular line-pair in said raster, comprising, an address register connected to the output of said address counter and controlled by said instruction register, the information stored in each of said storage channels comprising a plurality of transfer word blocks corresponding to a like number of discrete information cells on said line-pair, and means for correlating a particular cell in said selected line-pair with a corresponding word block in the respective channel identified with said line-pair comprising a transfer register energized by said instruction register and said address counter.

References Cited in the file of this patent

UNITED STATES PATENTS

| | | |
|---|---|---|
| 2,540,654 | Cohen | Feb. 6, 1951 |
| 2,611,025 | Jakowski | Sept. 16, 1952 |
| 2,614,169 | Cohen | Oct. 14, 1952 |
| 2,679,638 | Bensky | May 25, 1954 |

OTHER REFERENCES

Publication I entitled "Magnetic Drum Storage for Digital Information Processing Systems," in Mathematical Tables and Other Aids to Computation, by National Research Council of D.C., January 1950 (pages 31–39).

Publication II entitled "Universal High-Speed Digital Computers: A Magnetic Store" in Proceedings of Institute of Electrical Engineer, by Williams, Kilburn and Thomas; October 15, 1951 (pages 94–102).

Publication III entitled "Buffering Between Input-Output and the Computer," by Teiner, in Review of Input and Output Equipment Used in Computing Systems, Joint AIEE–IRE–ACM Computer Conference, March 1953 (pages 22–31).

Publication IV entitled "Seac Input-Output System," by Greenwald, in the same volume as Publication III (pages 35–36).

Publication V entitled "The Raydac System and Its External Memory," by Rehler, in the same volume as Publication III (pages 65 and 66).

Publication VI entitled "The University of Manchester Computing Machine," by Williams and Kilburn, in Review of Electronic Digital Computers, Joint AIEE–IRE Computer Conference, February 1952 (pages 57–61).

UNITED STATES PATENT OFFICE

CERTIFICATE OF CORRECTION

Patent No. 2,925,587 February 16, 1960

Ragnar Thorensen et al.

It is hereby certified that error appears in the printed specification of the above numbered patent requiring correction and that the said Letters Patent should read as corrected below.

Column 20, line 24, before "said" insert -- which --; line 75, after "current" insert -- to --.

Signed and sealed this 20th day of September 1960.

(SEAL)
Attest:

KARL H. AXLINE
Attesting Officer

ROBERT C. WATSON
Commissioner of Patents